(12) United States Patent
Maggio et al.

(10) Patent No.: US 11,900,644 B2
(45) Date of Patent: Feb. 13, 2024

(54) DOCUMENT IMAGE ANALYSIS APPARATUS, DOCUMENT IMAGE ANALYSIS METHOD AND PROGRAM THEREOF

(71) Applicant: Rakuten Group, Inc., Tokyo (JP)

(72) Inventors: Simona Maggio, Tokyo (JP); Alois De La Comble, Tokyo (JP); Ken Prepin, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/056,202

(22) PCT Filed: Oct. 31, 2019

(86) PCT No.: PCT/JP2019/042868
§ 371 (c)(1),
(2) Date: Nov. 17, 2020

(87) PCT Pub. No.: WO2021/084702
PCT Pub. Date: May 6, 2021

(65) Prior Publication Data
US 2021/0383106 A1    Dec. 9, 2021

(51) Int. Cl.
*G06V 10/25*    (2022.01)
*G06V 30/413*    (2022.01)
(Continued)

(52) U.S. Cl.
CPC ............ *G06V 10/25* (2022.01); *G06F 18/241* (2023.01); *G06F 18/2431* (2023.01);
(Continued)

(58) Field of Classification Search
CPC .... G06V 30/413; G06V 10/25; G06V 10/751; G06K 9/6268; G06K 9/628
See application file for complete search history.

(56) References Cited

U.S. PATENT DOCUMENTS

2009/0148042 A1\* 6/2009 Fan ...................... G06V 10/751
382/176
2009/0210215 A1\* 8/2009 Konno ................... G06F 40/58
382/229
(Continued)

FOREIGN PATENT DOCUMENTS

| JP | 2008-225964 A | 9/2008 |
| JP | 2009-251872 A | 10/2009 |
| JP | 2017-187923 A | 10/2017 |

OTHER PUBLICATIONS

International Search report for PCT/JP2019/042868 dated Jan. 21, 2020 (PCT/ISA/210).

*Primary Examiner* — Oneal R Mistry
(74) *Attorney, Agent, or Firm* — Sughrue Mion, PLLC

(57) ABSTRACT

Disclosed herein is a document image analysis apparatus including: a document image acquisition unit configured to acquire a document image; a region detection unit configured to detect a plurality of regions from the document image acquired by the document image acquisition unit; a clustering unit configured to cluster the plurality of regions detected by the region detection unit to integrate into a cluster; and a reading order assignment unit configured to assign a reading order to a plurality of regions belonging to the cluster within the cluster integrated by the clustering unit.

20 Claims, 23 Drawing Sheets

(51) Int. Cl.
  *G06F 18/241*    (2023.01)
  *G06F 18/2431*   (2023.01)
  *G06V 30/41*     (2022.01)
  *G06V 10/762*    (2022.01)

(52) U.S. Cl.
  CPC ............ *G06V 10/762* (2022.01); *G06V 30/41* (2022.01); *G06V 30/413* (2022.01)

(56) References Cited

U.S. PATENT DOCUMENTS

| | | | | |
|---|---|---|---|---|
| 2013/0329263 | A1* | 12/2013 | Enomoto | H04N 1/00225 |
| | | | | 358/470 |
| 2014/0013215 | A1* | 1/2014 | Sesum | G06V 30/414 |
| | | | | 715/247 |
| 2016/0085731 | A1* | 3/2016 | Bruno | G06F 40/134 |
| | | | | 715/205 |
| 2018/0032810 | A1* | 2/2018 | Oguro | H04N 19/184 |
| 2019/0005324 | A1* | 1/2019 | Anisimovskiy | G06N 3/08 |
| 2019/0266397 | A1* | 8/2019 | Arakawa | H04N 1/00413 |
| 2020/0089945 | A1* | 3/2020 | Kitamura | G06V 30/412 |

\* cited by examiner

FIG. 22

```xml
<?xml version="1.0"?>

<articles>
<article>
<part type="title">La forêt et le bois se mettent en scène</part>
<part type="subtitle">sur le thème"Vive(z) le bois".C' est ouvert au grand public</part>
<part type="illustration">00.xml_data/image-2.png</part>
<part type="caption">Les crayons de couleur de la taille d'une branche d'arbre réveillent l'imaginaire de l'enfant.</part>
<part type="column">Abc...de...abc...de...abc...de...abc...de...abc...de...</part>
<part type="column">fgh...ij...fgh...ij...fgh...ij...fgh...ij...fgh...ij...</part>
<part type="column">klm...no...klm...no...klm...no...klm...no...klm...no...</part>
<part type="column">pqr...st...pqr...st...pqr...st...pqr...st...pqr...st...</part>
<part type="column">uvw...xyz...uvw...xyz...uvw...xyz...uvw...xyz...</part>
<part type="signature">Correspondant NR</part>
</article>
</articles>

```

DOCUMENT IMAGE ANALYSIS APPARATUS, DOCUMENT IMAGE ANALYSIS METHOD AND PROGRAM THEREOF

CROSS REFERENCE TO RELATED APPLICATIONS

This application is a National Stage of International Application No. PCT/JP2019/042868 filed Oct. 31, 2019.

TECHNICAL FIELD

The present invention relates to a document image analysis apparatus, a document image analysis method, and a program thereof, and more particularly, to a technique for detecting a document structure from a document image and automatically generating a structured document based on the detected document structure.

BACKGROUND ART

Articles to be published on paper media such as newspapers or magazines are typically created as Portable Document Format (PDF) files, which are made available for printing, and then published. The PDF files of the post-publication articles are archived by the publisher.

The PDF files of those articles are stored on the web platform and made accessible, so that articles such as newspapers or magazines can be reused as web content.

However, when attempting to browse those articles as the web content on an as-is layout of the original paper medium, for example, on a mobile phone, a user is forced to perform an excessive scrolling or zooming operation in order to browse the entire article. The complexity of such operations is likely to hinder the full utilization of articles as the web content.

On the other hand, devices for browsing the web content include personal computers (PCs), tablets, mobile phones, and the like, and a display size and an aspect ratio thereof considerably vary depending on the types of devices.

In order to enhance the browsability of an article converted to a PDF file in each of those various devices, it is required to optimize a layout structure of the article by adapting the layout structure of the article to the particular display size and the aspect ratio of each device. In addition, a variety of use cases can be envisaged, including reusing archived articles for electronic proposals, advertisements, and electronic publications, which are provided with interactive functions.

As such, when the layout structure of the article is to be changed in compliance with the device type or the use case, it is necessary that the article is laid out in an intended reading order, in other words, that the layout structure after the layout change follows an originally intended reading order of the article. This is because, once the reading order of the article collapses in association with the layout change, the browsability of the article may be impaired.

Patent Literature 1 (JP 2008-225964A) discloses an image processing apparatus that divides a document image into a plurality of image regions and assigns a reading order to each of the image regions. More particularly, the image processing apparatus disclosed in Patent Literature 1 divides a document image inputted by a scanner or the like into regions such as a character region, a chart region, and a photograph region as preprocessing of the Optical Character Recognition (OCR), and assigns the reading order to the extracted plurality of character regions in order from top left to bottom right in accordance with the start point coordinates and end point coordinates of the respective character regions.

LISTING OF REFERENCES

Patent Literature

PATENT LITERATURE 1: Laid-open Publication of Japanese Patent Application No. 2008-225964 A

SUMMARY OF THE INVENTION

Problems to be Solved by the Invention

However, articles typically include a variety of elements, such as titles, columns (article bodies), photographs or illustrations, captions, and the like, which are laid out in a complex manner.

In those cases, in the technique disclosed in Patent Literature 1 (JP 2008-225964A), the reading order cannot be assigned throughout a plurality of types of regions including a chart region and a photograph region.

In addition, when the reading order is simply assigned in the order from the top left to the bottom right of the document image, the more complicated the layout of the article becomes, for example, in the case of an article in which vertical and horizontal sets are mixed, the greater the risk of discrepancy between the assigned reading order and the reading order originally intended by the article. For example, in the case where columns of the same article are separately arranged in front of and after a photograph or an illustration in a sequence from the top left to the bottom right of a document image, semantically consecutive columns are inevitably divided.

The present invention has been made in order to solve the above mentioned problems and an object thereof is to provide a document image analysis apparatus, a document image analysis method, and a program thereof that are capable of assigning attributes such as a reading order to a document image with higher accuracy.

Solution to Problems

In order to solve the above mentioned problems, according to one aspect of the present invention, there is provided a document image analysis apparatus, comprising: a document image acquisition unit configured to acquire a document image; a region detection unit configured to detect a plurality of regions from the document image acquired by the document image acquisition unit; a clustering unit configured to cluster the plurality of regions detected by the region detection unit to integrate into a cluster; and a reading order assignment unit configured to assign a reading order to a plurality of regions belonging to the cluster within the cluster integrated by the clustering unit.

The region detection unit may classify the plurality of regions detected and assign a category to each of the plurality of regions.

The region detection unit may include: a first analytical engine configured to analyze text of the document image, and detect the plurality of regions to classify the plurality of regions detected; and a second analytical engine configured to analyze an image of the document image, and detect the plurality of regions to classify the plurality of regions detected, and the region detection unit may execute both of the first analytical engine and the second analytical engine.

The document image analysis apparatus may further comprise: a merging unit configured to merge complementarily detection and classification results of the plurality of regions output by the first analytical engine, and detection and classification results of the plurality of regions output by the second analytical engine, and supply merged results to the clustering unit.

When a detected region overlaps between the first analytical engine and the second analytical engine, the merging unit may retain a category assigned by the second analytical engine to the detected region.

When a detected region overlaps between the first analytical engine and the second analytical engine, the merging unit may correct a bounding box detected by the second analytical engine with respect to the detected region with information of the detected region detected by the first analytical engine.

The merging unit may compare a size of a region that is detected by the first analytical engine and not detected by the second analytical engine with a predetermined threshold, and may not output the region to the clustering unit when the size is equal to or smaller than the predetermined threshold.

The clustering unit may calculate a distance to an adjacent region for each of the plurality of regions, and clusters the plurality of regions based on the distance calculated.

The clustering unit may dynamically determine a threshold of the distance to the adjacent region calculated for each of the plurality of regions, and cluster regions within the threshold of the distance determined.

The clustering unit may determine a region that has a maximum value of shortest distance to an adjacent region among the plurality of regions, and set the maximum value of the shortest distance to the adjacent region to the threshold value of the distance.

The clustering unit may cluster regions adjacent to each other in a vertical direction of the document image based on the distance to the adjacent region, and cluster regions adjacent to each other in a horizontal direction of the document image based on the category assigned to each region.

The clustering unit may cluster the plurality of regions based on the category assigned to each of the plurality of regions.

The clustering unit may cluster the plurality of regions based on a size of the region to which a predetermined category is assigned.

The reading order assignment unit may classify the plurality of regions belonging to the cluster into a plurality of super-classes each generalized from a plurality of categories, sort regions classified into a super-class within each super-class, and assign the reading order to the regions sorted.

The reading order assignment unit may further sort the plurality of super-classes to assign the reading order to the plurality of regions belonging to the cluster.

The reading order assignment unit may assign the reading order to the plurality of regions belonging to each cluster such that the reading order is continuous among a plurality of clusters.

The clustering unit may integrate clusters over a plurality of document images based on the categories assigned to the plurality of regions, respectively.

The document image analysis apparatus may further comprises: a structured document generation unit configured to generate a structured document that describes at least the reading order, text, and the category of the regions included in the cluster from the cluster including the regions to which the reading order is assigned by the reading order assignment unit.

According to another aspect of the present invention, there is provided a document image analysis method executed by a document image analysis apparatus, comprising steps of: acquiring a document image; detecting a plurality of regions from the document image acquired; clustering the plurality of regions detected to integrate into a cluster; and assigning a reading order to a plurality of regions belonging to the cluster within the cluster integrated.

According to yet another aspect of the present invention, there is provided a document image analysis program for causing a computer to execute document image analysis processing, the program causing the computer to execute processing comprising: a document image acquisition process for acquiring a document image; a region detection process for detecting a plurality of regions from the document image acquired by the document image acquisition process; a clustering process for clustering the plurality of regions detected by the region detection process to integrate into a cluster; and a reading order assignment process for assigning a reading order to a plurality of regions belonging to the cluster within the cluster integrated by the clustering process.

Advantageous Effect of the Invention

According to the present invention, it makes it possible to assign attributes such as a reading order to a document image with higher accuracy.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 22 is a diagram showing an example of an XML description of a structured document output in the structured document output processing in (step S6) of FIG. 2.

DESCRIPTION OF EMBODIMENTS

Figure 1:
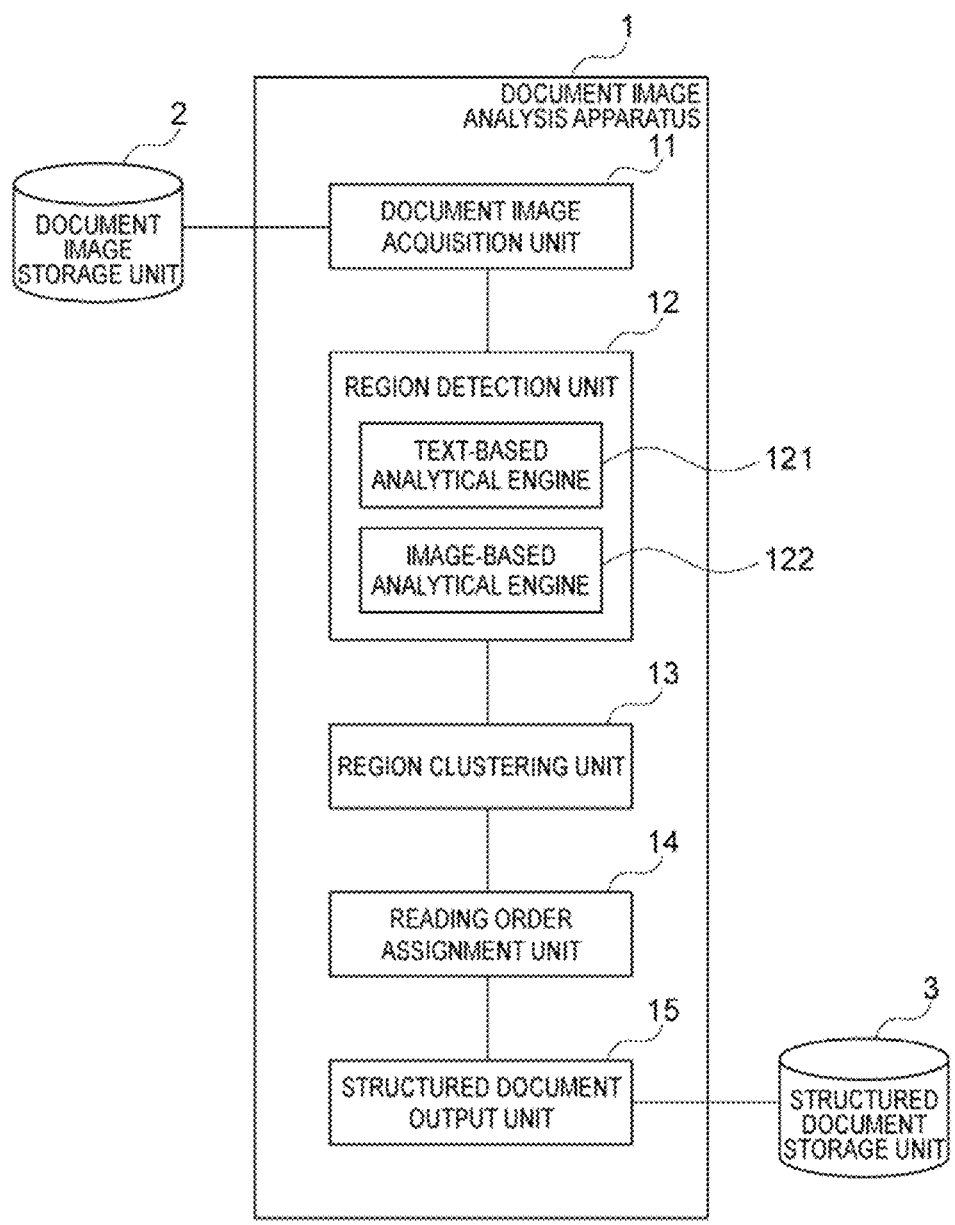
FIG. 1 is a block diagram showing an exemplary functional configuration of a document image analysis apparatus according to a present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a document image analysis apparatus according to the present embodiment analyzes a Portable Document Format (PDF) file including articles such as newspapers and magazines as content and outputs a structured eXtensible Markup Language (XML). Nevertheless, the present embodiment is not limited thereto.

The document image analysis apparatus according to this embodiment is capable of inputting any content, including a document and an image, in any image format, such as Tagged Image File Format (TIFF), Joint Photographic Expert Group (JPEG), or any Desk Top Publishing (DTP) format or document format, such as Adobe Illustrator (AI), Encapsulated PostScript (EPS), PhotoShop Document (PSD), and the like. The document image analysis apparatus is also capable of describing the generated structured document in any description language, such as Standard Generalized Markup Language (SGML), Hyper Text Markup Language (HTML), or the like.

Functional Configuration of Document Image Analysis Apparatus

FIG. 1 is a block diagram showing an exemplary functional configuration of a document image analysis apparatus according to the present embodiment.

The document image analysis apparatus 1 shown in FIG. 1 includes a document image acquisition unit 11, a region detection unit 12, a region clustering unit 13, a reading order assignment unit 14, and a structured document output unit 15.

The document image acquiring unit 11 acquires a document image of articles stored in a document image storage unit 2 in the format of the PDF file and supplies the acquired document image to the region detection unit 12.

The region detection unit 12 detects a plurality of regions as segments from the document image acquired by the document image acquiring unit 11, classifies each of the detected regions into categories such as a title, a column (an article body), a photograph or an illustration, or the like, and supplies the categorized regions of the document image to the region clustering unit 13.

According to the present embodiment, the region detection unit 12 includes a text-based analytical engine 121 that detects regions and classifies the detected regions into categories on a text basis, and an image-based analytical engine 122 that detects regions and classifies the detected regions into categories on an image basis. Both the text-based analytical engine 121 and the image-based analytical engine 122 are driven in parallel by the region detection unit 12.

The region clustering unit 13 clusters a plurality of regions classified into respective categories into an article, and supplies the article to the reading order assignment unit 14.

The reading order assignment unit 14 assigns a reading order to a plurality of regions in the clustered article, and supplies data of the article to which the reading order is assigned to the structured document output unit 15.

The structured document output unit 15 generates a structured document described in a description language such as XML from the data of the article to which the reading order is assigned, and outputs the generated structured document to the structured document storage unit 3.

Eventually, the structured document output to the structured document storage unit 3 contains information that is not described in the original PDF file. More particularly, the structured document output to the structured document storage unit 3 is appended (annotated) with attributes such as, at least, the delimiter between articles, the reading order of the regions within the article, the classified category classes, a font type, a font size, and a font color of characters so as to allow the layout of the document image to be dynamically reconstructed according to various device types or use cases. As a result, the structured document according to the present embodiment is provided with enhanced structuring information as compared to the original PDF file.

It should be noted that the configuration shown in FIG. 1 merely exemplifies the functional configuration of the document image analysis apparatus, and does not intend that the document image analysis apparatus according to the present embodiment is implemented in a single device. Alternatively, the functional configuration shown in FIG. 1 may be implemented in, for example, devices such as a plurality of servers interconnected via a network, and the respective components of the document image analysis apparatus 1, the document image storage unit 2, and the structured document storage unit 3 shown in FIG. 1 may be implemented in devices distinct from one another.

Outline Processing Procedure of Document Image Analysis Processing

Figure 2:
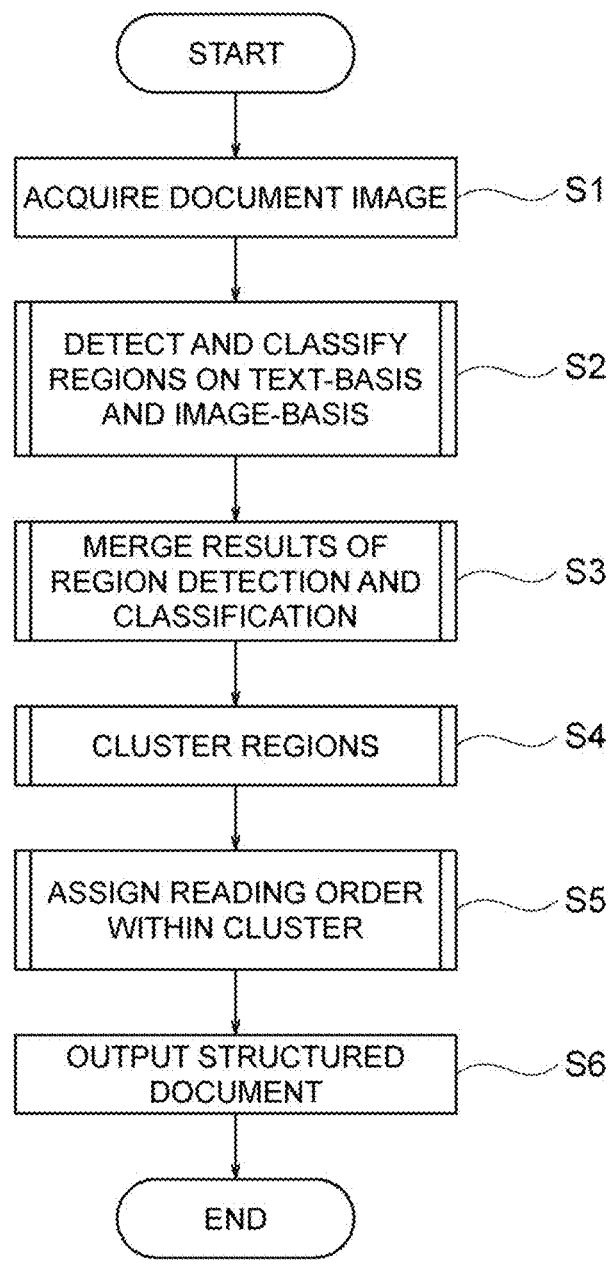
FIG. 2 is a flowchart illustrating an exemplary outline processing procedure of the document image analysis processing executed by the document image analysis apparatus according to the present embodiment of the present invention.

FIG. 2 is a flowchart illustrating an exemplary outline processing procedure of the document image analysis processing executed by the document image analysis apparatus 1 according to the present embodiment.

Each step shown in FIG. 2 may be performed by the CPU reading and executing a program stored in the storage device of the document image analysis apparatus 1. Alternatively, at least a part of the flowchart shown in FIG. 2 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the document image acquisition unit 11 of the document image analysis apparatus 1 acquires a document image in, for example, a PDF file format. The document image may be acquired from the document image storage unit 2 consisting of a storage device, or otherwise may be input directly, or from an external device via a network, to the document image analysis apparatus 1.

Hereinafter, an example will be described in which the document image includes an article such as a newspaper or a magazine, and each article includes a title, a column (article body), and a photograph or an illustration.

It should be noted that the document image acquired by the document image acquisition unit 11 may be an article including a text and an image originally created as a PDF file, or may be an article ex post facto converted into a PDF file by scanning an article on a paper medium such as a newspaper or a magazine.

In step S2, the region detection unit 12 of the document image analysis apparatus 1 detects a plurality of regions from the document image acquired in step S1 and classifies each of the detected regions into categories. The region detected here is a segment in the document image and is a block or a paragraph which is a component constituting the article.

Figure 3:
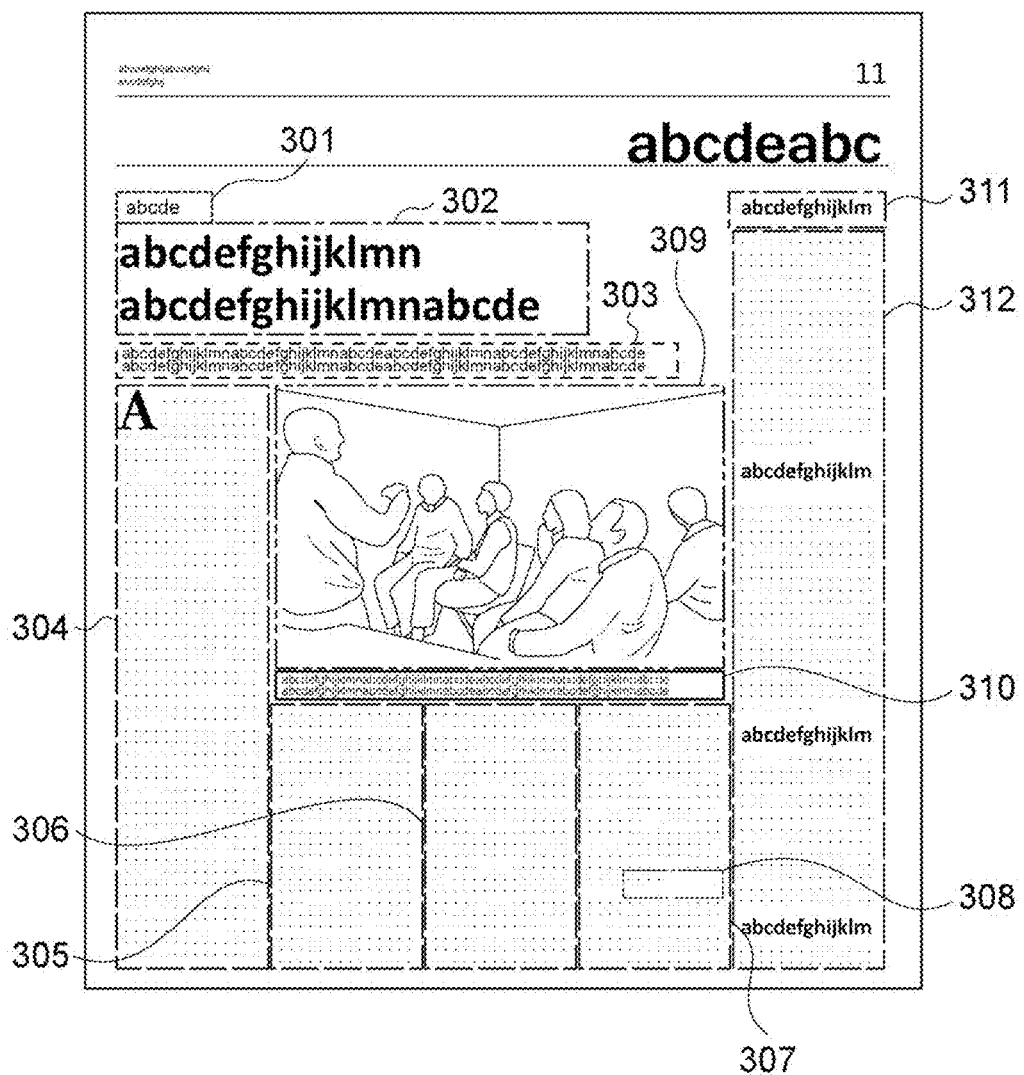
FIG. 3 is a schematic diagram showing an exemplary document image in which regions are detected and respective categories are labeled thereto, which is output in the region detection processing (step S2) of FIG. 2.

FIG. 3 shows an example of an output from the region detection unit 12 in step S2 and shows an exemplary document image in which the regions are detected and respective categories are labeled thereto.

Referring to FIG. 3, regions 301 to 312 are detected from a document image of one page. The regions 301 to 312 are classified into categories and labeled with classified categories, respectively. More particularly, the region 301 is classified as a pre-title, the region 302 and the region 311 are classified as titles, respectively, and the region 303 is classified as a sub-title. The regions 304 to 307 and 312 are classified into columns (article bodies), respectively. The region 308 is detected at the end of the column region 307 and classified into a signature of the article author. The region 309 is classified into a photograph (hereinafter photographs and illustrations are referred simply to as "illustration") and the region 310 is classified into a caption that describes the photograph, respectively.

According to the present embodiment, as described above, in step S2, both the processing of text-based region detection and category classification of detected regions, which are carried out by the text-based analytical engine, and the processing of image-based region detection and category classification of detected regions, which are carried out by the image-based analytical engine, are executed in parallel. Details of those processing will be described hereinafter with reference to FIGS. 6 to 10. It should be noted that the term "executed in parallel" is not limited to the meaning of being executed in parallel in time series, and both may be executed simultaneously or sequentially.

In step S3, the region detection unit 12 of the document image analysis apparatus 1 merges the result of the region detection and the category classification of the detected regions by the text-based analytical engine and the result of the region detection and the category classification of the detected regions by the image-based analytical engine into one processing result for each region. By this kind of merge processing, a region detection result in which classified categories are labeled to respective detected regions, which is optimized for each region, is obtained, and the details of the processing will be described hereinafter with reference to FIGS. 12 to 14.

In step S4, the region clustering unit 13 of the document image analysis apparatus 1 clusters regions labeled with the respective classified categories, which is output from step S3, into an article.

Figure 4:
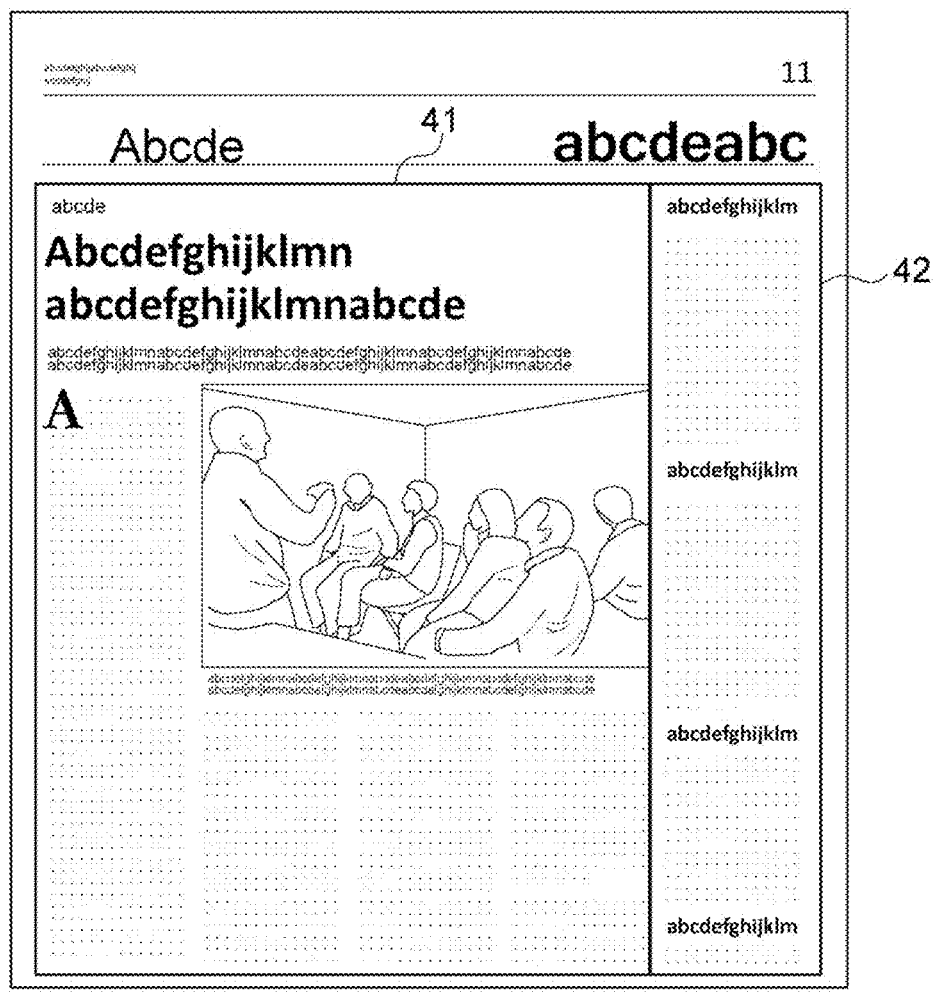
FIG. 4 is a schematic diagram showing an exemplary document image in which a plurality of regions are clustered into an article, which is output in the region clustering processing (step S4) of FIG. 2.

FIG. 4 shows an example of an output which is output from the region clustering unit 13 in step S4, and also shows an exemplary document image in which a plurality of regions are clustered into an article.

Referring to FIG. 4, regions 301 to 310 of the document image detected in FIG. 3 are clustered into an article 41, and regions 311 to 312 are clustered into an article 42, respectively. Each of the articles 41 and 42 constitutes a cluster within the document image. Details of this region clustering processing will be described hereinafter with reference to FIGS. 15 to 18.

When the document image acquired in step S1 covers a plurality of pages, a process of integrating the articles clustered in each page into one article across a plurality of pages is carried out in step S4, and the details of the processing will be described hereinafter with reference to FIG. 21.

In step S5, the reading order assignment unit 14 of the document image analysis apparatus 1 assigns a reading order to a plurality of regions included in the article for each of the articles output from step S4.

Figure 5:
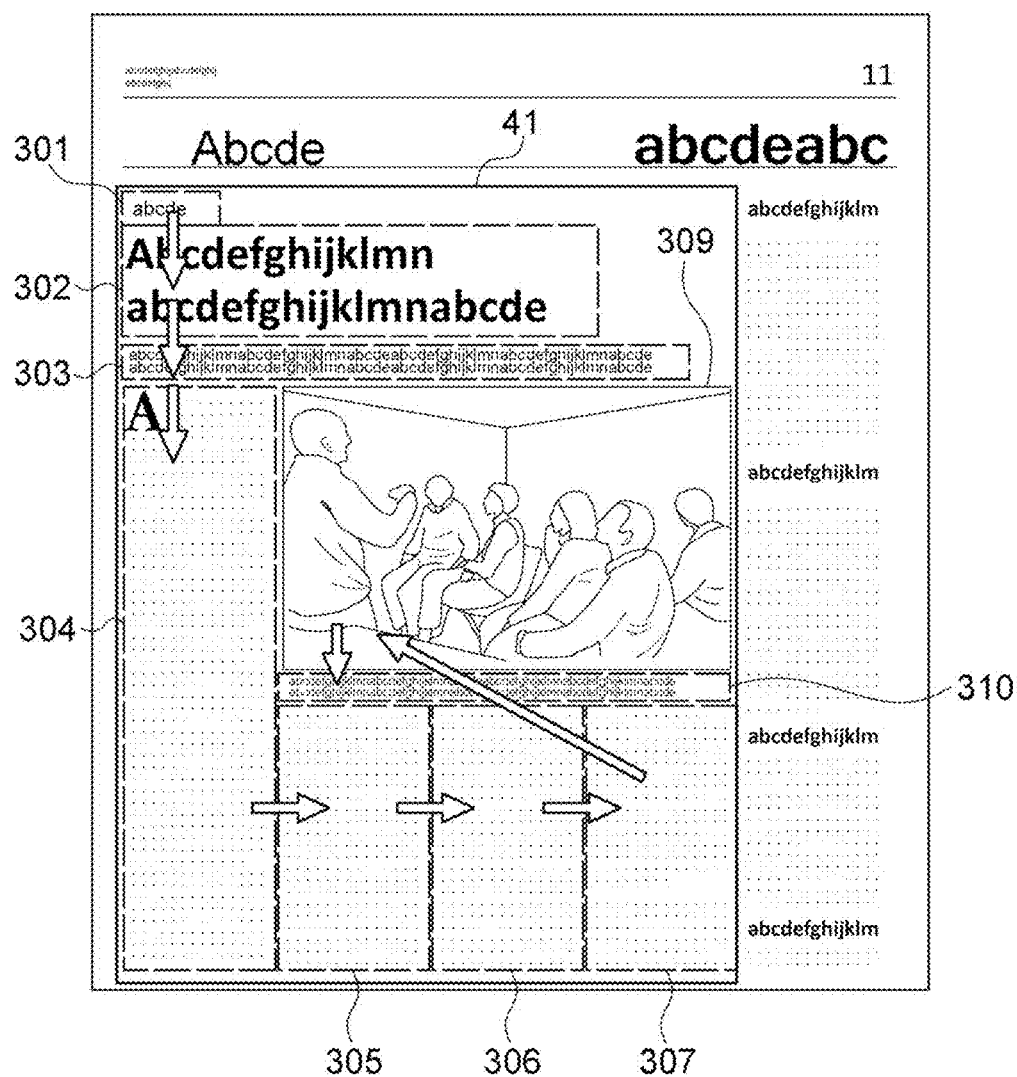
FIG. 5 is a schematic diagram showing an exemplary document image in which a reading order is assigned to the regions in an article, which is output in the reading order assignment processing (step S5) of FIG. 2.

FIG. 5 shows an example of an output which is output from the reading order assignment unit 14 in step S5 and shows an exemplary document image in which a reading order is assigned to a plurality of regions in an article.

Referring to FIG. 5, the reading order is assigned to the regions 301 to 310 of the document image clustered in the article 41 in FIG. 4, in the order of the pre-title region 301, the title region 302, the sub-title region 303, the column regions 304 to 307, the illustration region 309, and the caption region 310 in turn.

It should be noted that the reading order assigned to the regions in the article follows the natural reading order when a reader can glance at the whole article, and the details of the reading order assigning processing will be described hereinafter with reference to FIGS. 19 and 20.

In step S6, the structured document output unit 15 of the document image analysis apparatus 1 describes the document image, which is output from step S5 and in which the each region is labeled with any of categories and the reading order is assigned to a plurality of regions in the article, as a structured document in a description language, and outputs the document image to the structured document storage unit 3.

Text-Based Region Detection and Region Classification Processing Details

Figure 6:
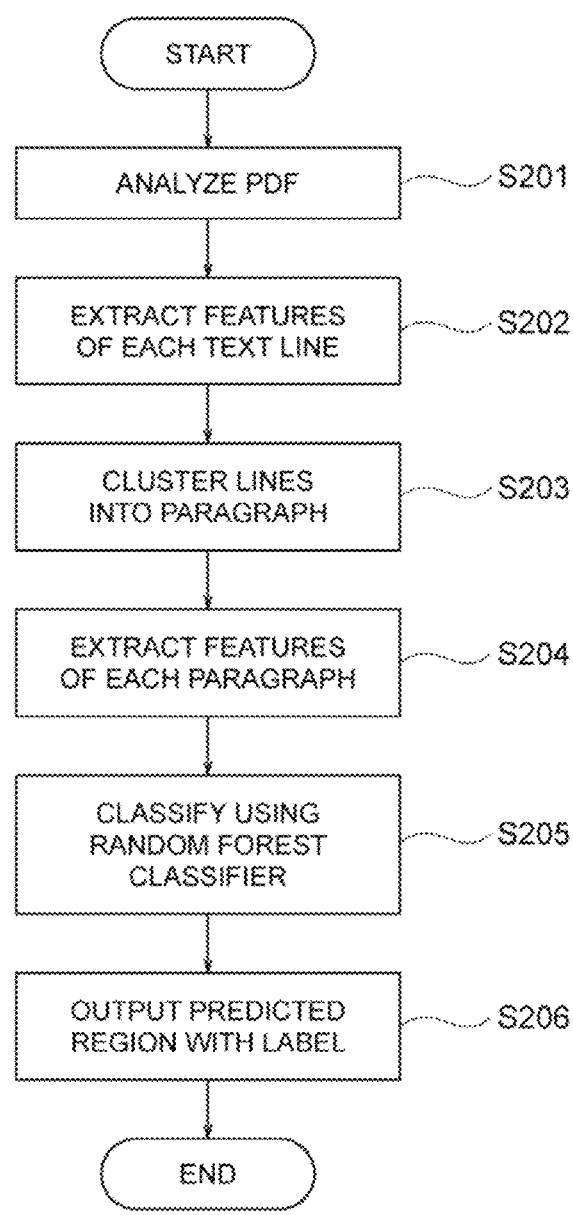
FIG. 6 is a flowchart illustrating an exemplary detailed processing procedure of text-based region detection processing carried out in the region detection processing (step S2) of FIG. 2.

FIG. 6 is a flowchart showing an exemplary detailed processing procedure of the text-based region detection processing carried out by the text-based analytical engine 121 of the region detection unit 12 of the document image analysis apparatus 1.

In step S201, the text-based analytical engine 121 analyzes the PDF file of the document image acquired in step S1 of FIG. 2 and extracts the text therefrom.

In step S202, the text-based analytical engine 121 extracts the features of each line of text for the text portion of the document image based on the analysis result in step S201.

The features of each line of text extracted in step S202 may include at least a font type, a font size, a font color (RGB), coordinate values, uppercase/lowercase, whether a title or not. Whether or not the category of the text line is a title may be estimated based on other features extracted in addition to the title, i.e., the font type, the font size, the font color, the coordinate values, the uppercase/lowercase, or otherwise the text itself may be analyzed semantically.

Figure 7:
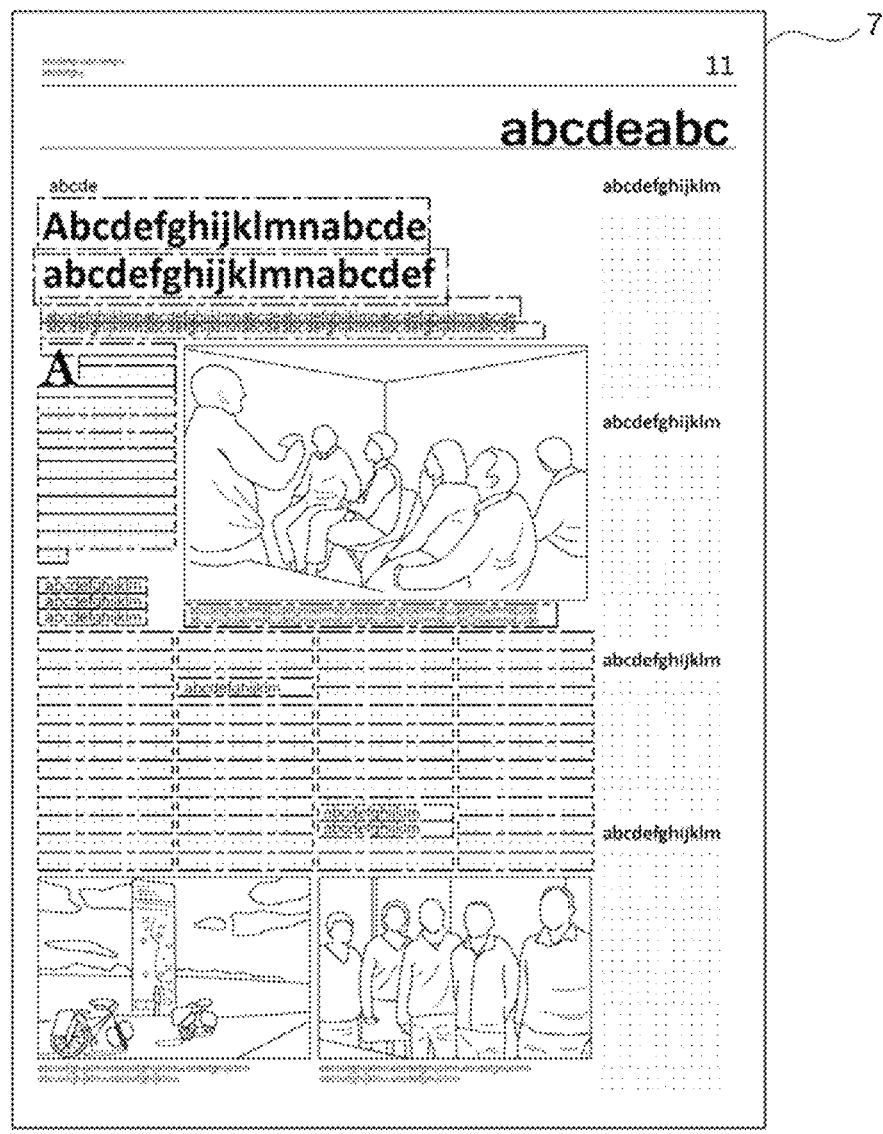
FIG. 7 is a schematic diagram showing an exemplary document image in which text lines are extracted in the text-based region detection processing of FIG. 6.

FIG. 7 illustrates an example in which the text-based analytical engine 121 in step S202 detects a line of text per line from the text portion of the document image. Referring to FIG. 7, a rectangular box, shown as a dashed-dotted line, denotes each line of text detected from the text in the document image.

In step S203, the text-based analytical engine 121 clusters the lines of text extracted in step S202 into paragraphs (regions).

Figure 8:
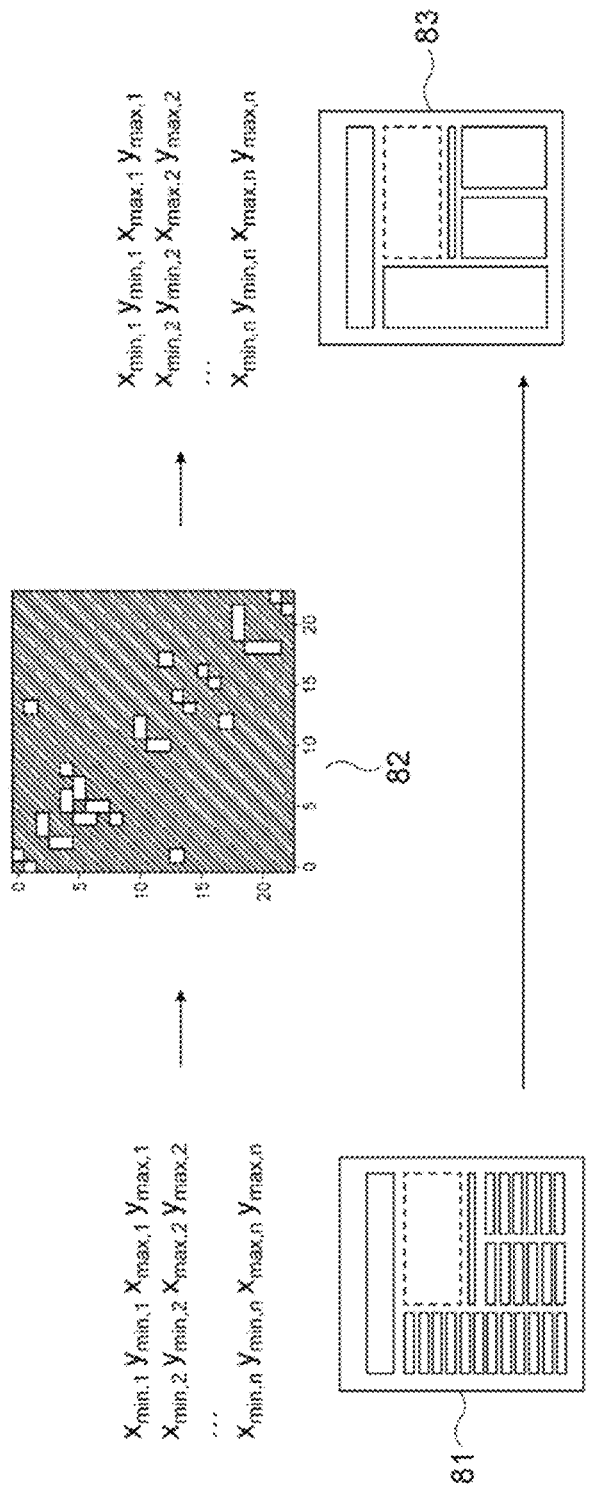
FIG. 8 is a schematic diagram showing clustering processing from the lines of text into a paragraph, which is carried out in the text-based region detection processing of FIG. 6.

FIG. 8 is a schematic diagram illustrating the clustering processing into a paragraph from lines of text carried out by a text-based analytical engine 121.

In the document image 81 on the left of FIG. 8, the text of the title of the article and the columns are detected for each single line of text, and each line of text has at least the coordinate values of a start point and an end point that identify a position the line of text, respectively.

The text-based analytical engine 121 clusters the lines of text into paragraphs based on the distance between the lines of text in the document image 81. A matrix 82 on the middle of FIG. 8 shows, in a matrix form, the distance of each line of text extracted in the document image 81 with respect to other lines of text, and each cell of the distance matrix indicates whether or not the distance between two lines of text exceeds a predetermined threshold.

In the document image 83 shown on the right of FIG. 8, the lines of text within a predetermined threshold of distance are clustered into a paragraph (region), and each paragraph has at least the start point and the end point coordinate values that identify a position of the paragraph. Since the clustering processing of the lines of text shown in FIG. 8 can be carried out at a relatively low load and at high speed, the clustering processing may be performed a plurality of times to improve the accuracy of clustering.

Returning to FIG. 6, in step S204, the text-based analytical engine 121 extracts the features of paragraphs, which are clustered in step S203, based on the features of the respective lines of text extracted in step S202. The features of each paragraph extracted in step S204 may include at least the width and height of the paragraph, the aspect ratio, coordinate values, number of lines of clustered lines of text, the relative font size with respect to other paragraphs, and the presence or absence of a lettrine that controls the size and arrangement of a first letter of the paragraph.

In step S205, the text-based analytical engine 121 classifies the lines of text extracted in step S202 into respective categories using the machine learning algorithm and labels each line of text with one of the classified categories. For example, the Random Forest Classifier can be used as the machine learning algorithm for classifying lines of text of the document image. The Random Forest Classifier outputs, as a predicted value, a representative value (e.g., an average value) of the values output by a large number of decision trees, respectively. Each decision tree constituting the random forest is created based on sub training data extracted as different subsets from the original training data, and different explanatory variables are used as candidates for the division of the decision trees so as to ensure the randomness of the decision trees.

According to the present embodiment, in order to classify the lines of text of the document image, not only the features extracted from each line of text in a unit of text line but also the features in a unit of more global paragraph extracted in step S204 are added to the explanatory variables and then the classification is performed, thereby improving the accuracy of classification in the machine learning.

Furthermore, according to the present embodiment, in step S205, each line of text is classified into categories such as the pre-title, the title, the sub-title, the column, or the like, and subsequently the text-based analytical engine 121 further groups adjacent lines of text having the same category based on the category assigned to each line of text. Thus, it makes it possible to optimize clustering into paragraphs in step S203.

In step S206, the text-based analytical engine 121 eventually clusters the lines of text labeled with respective categories into paragraphs (regions), labels the clustered regions with respective categories, and outputs the regions as predicted regions in the document images.

Image-Based Region Detection and Region Classification Processing Details

Figure 9:
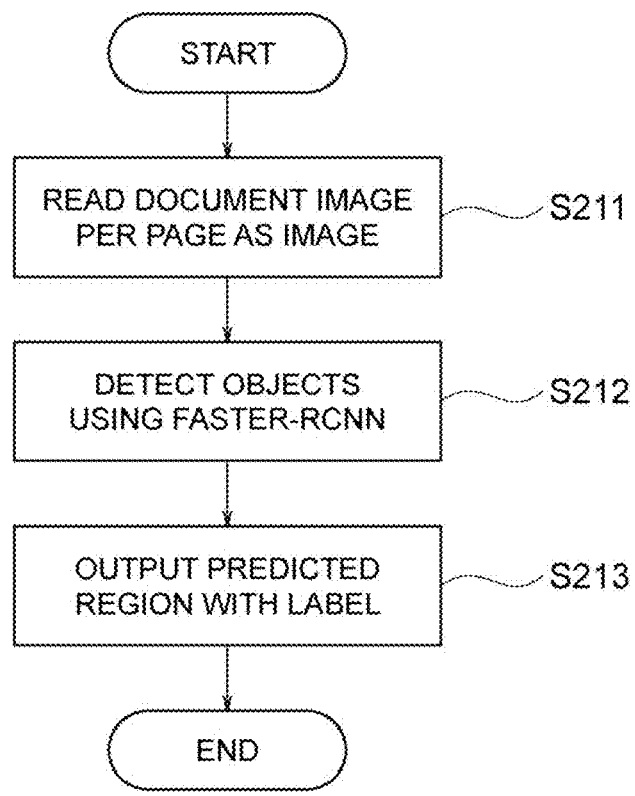
FIG. 9 is a flowchart illustrating an exemplary detailed processing procedure of image-based region detection processing carried out in the region detection processing (step S2) of FIG. 2.

FIG. 9 is a flowchart illustrating an exemplary detailed processing procedure of the text-based region detection processing carried by the image-based analytical engine 122 of the region detection unit 12 of the document image analysis apparatus 1. The processing shown in FIG. 9 may be carried out in parallel with the text-based region detection processing performed by the text-based analytical engine 121 shown in FIG. 6, in other words, may be carried out simultaneously or sequentially with the text-based region detection processing.

In step S211, the image-based analytical engine 122 reads the PDF file of the document image acquired in step S1 of FIG. 2 as an image page by page.

Figure 10:
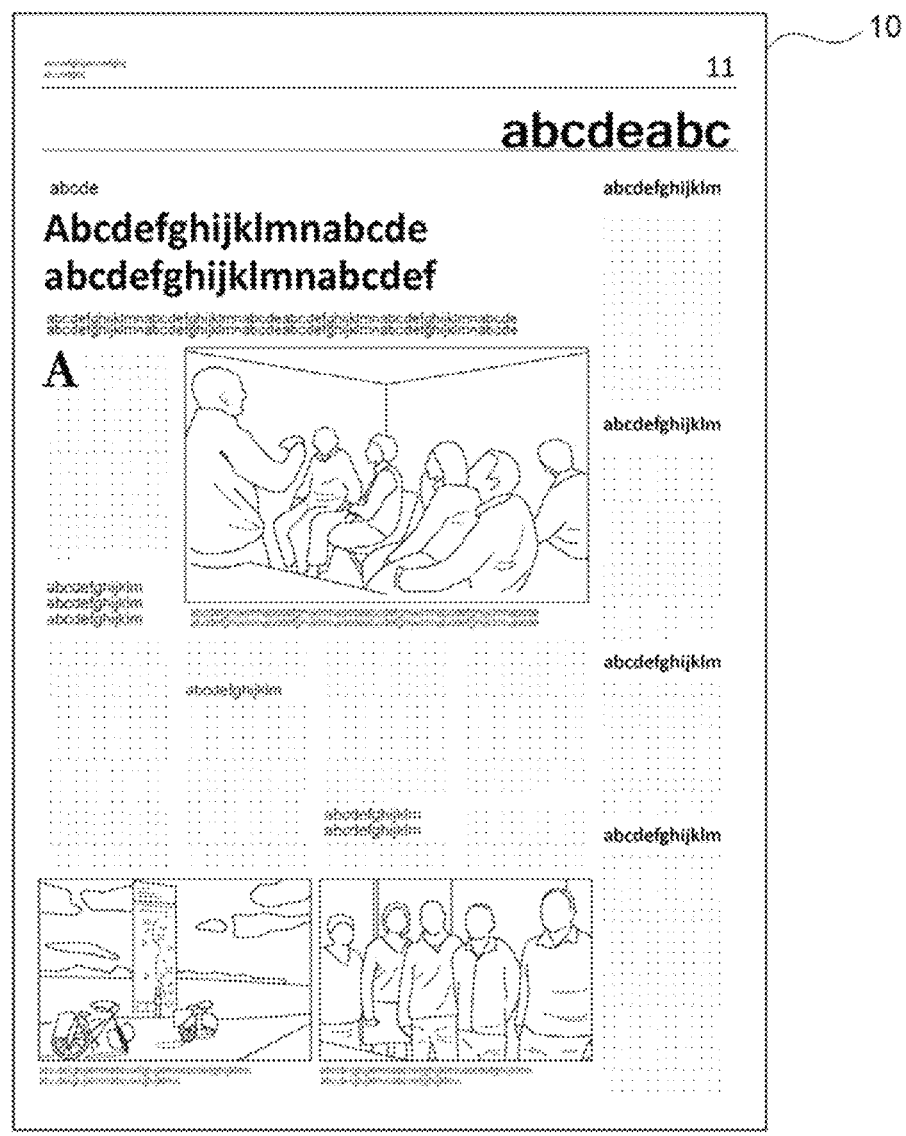
FIG. 10 is a schematic diagram showing an exemplary document image read in the image-based region detection processing of FIG. 9.

FIG. 10 shows an exemplary document image to be read. Referring to FIG. 10, a document image 10 of one page containing an image and text is read as a single image file.

In step S212, the image-based analytical engine 122 applies the machine learning algorithm to the images acquired in step S211, detects objects therein, classifies the detected objects into respective categories, and labels the objects with respective classified categories. The machine learning algorithm, e.g., Faster Region-Convolutional Neural Network (R-CNN), can be used to detect objects from document images and classify the detected objects into respective categories. The machine learning algorithm that can be used by the image-based analytical engines are not limited to Faster R-CNN, and, for example, R-CNN, Fast R-CNN, You Only Look Once (YOLO) or the like may be used.

In Faster R-CNN, the CNN is trained by inputting object images of articles with correct answers for a sufficient number of samples, for example, 500 pages, into the CNN for training in advance.

The feature map of the document image is extracted by the trained CNN from the entire document image of input one page.

Subsequently, using the Region Proposal Network (RPN), a bounding box (BB) for a candidate region and the confidence score that represents the object likelihood of the candidate region are output with respect to the feature map of the document image extracted by the CNN. More particularly, the RPN is a small neural network, the RPN scans the feature map with a sliding window of n×n size, makes each n×n size region of interest as an input to the network, and estimates k candidate regions with respect to each sliding window position.

The Faster R-CNN classifies the bounding boxes of the estimated candidate regions into one of a plurality of categories based on the feature vectors extracted from the candidate region.

Figure 11:
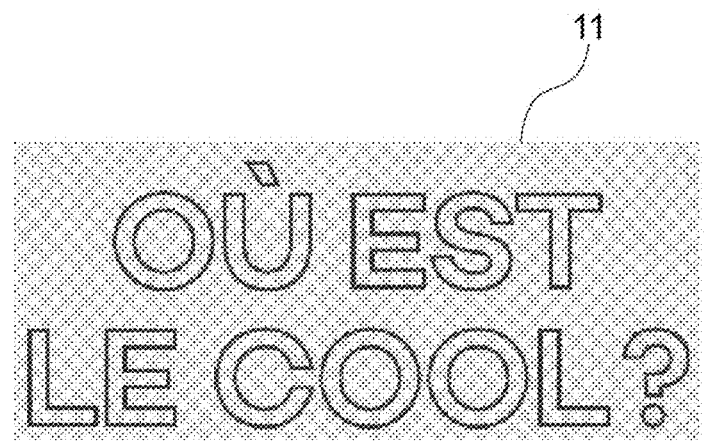
FIG. 11 is a schematic diagram showing an example of a title of an article read as an image.

Image-based analytical engine 122 is capable of classifying the candidate regions into any category using the Faster R-CNN or the like. For example, it is assumed that an image shown in FIG. 11 is an object image that is laid out in the document image as the title of the article but does not have text information in the PDF file. In this case, the text-based analytical engine 121 cannot detect a line of text and therefore cannot extract it as a region. On the other hand, the image-based analytical engine 122 extracts the image shown in FIG. 11 as a candidate region including an object, and recognizes an object in the image, thereby extracting the image as a title region.

As described above, the present embodiment uses in parallel the text-based region detection and region classification processing and the image-based region detection and region classification processing for one document image complementarily. This is because, comparing the text-based processing with the image-based processing, each has its own advantage and problem.

Namely, the text-based region detection and region classification can be realized with fewer training data, with a lower CPU processing load at higher speed, and the likelihood of failing to extract regions that obviously belong to text is low. On the other hand, the text-based region detection and region classification is less accurate as compared to the image-based processing, and regions cannot be extracted from an image as shown in FIG. 11, for example.

In contrasts, the image-based region detection and region classification is more robust and can be assumed to be more accurate as compared to the text-based processing, but the CPU processing load is higher and the processing speed is lower. In addition, the threshold of the confidence score is required to be adjusted lower, because a text region having a larger size is likely to be missed when the threshold of the confidence score for detecting the bounding box of the region is set high.

Furthermore, when lowering the threshold of the confidence score, a larger number of bounding boxes of overlapping candidate regions are more likely to be detected. Therefore, by applying an algorithm such as the Non-Maximum Suppression, which will be described later referring to FIG. 13, the number of candidate regions needs to be suppressed in order not to detect an excessively large number of candidate regions. Yet furthermore, when the title of the article is written in lowercase rather than uppercase, in the image-based region detection such title is less distinct from the column and it may be relatively difficult to classify as the title region.

As described above, by complementarily using a plurality of techniques of region detection and region classification having distinct characteristics from each other, according to the present embodiment, it makes it possible to improve the accuracy in detecting of the regions constituting the article from the document image and labeling the detected regions with the respective categories while suppressing the CPU processing load.

Figure 12:
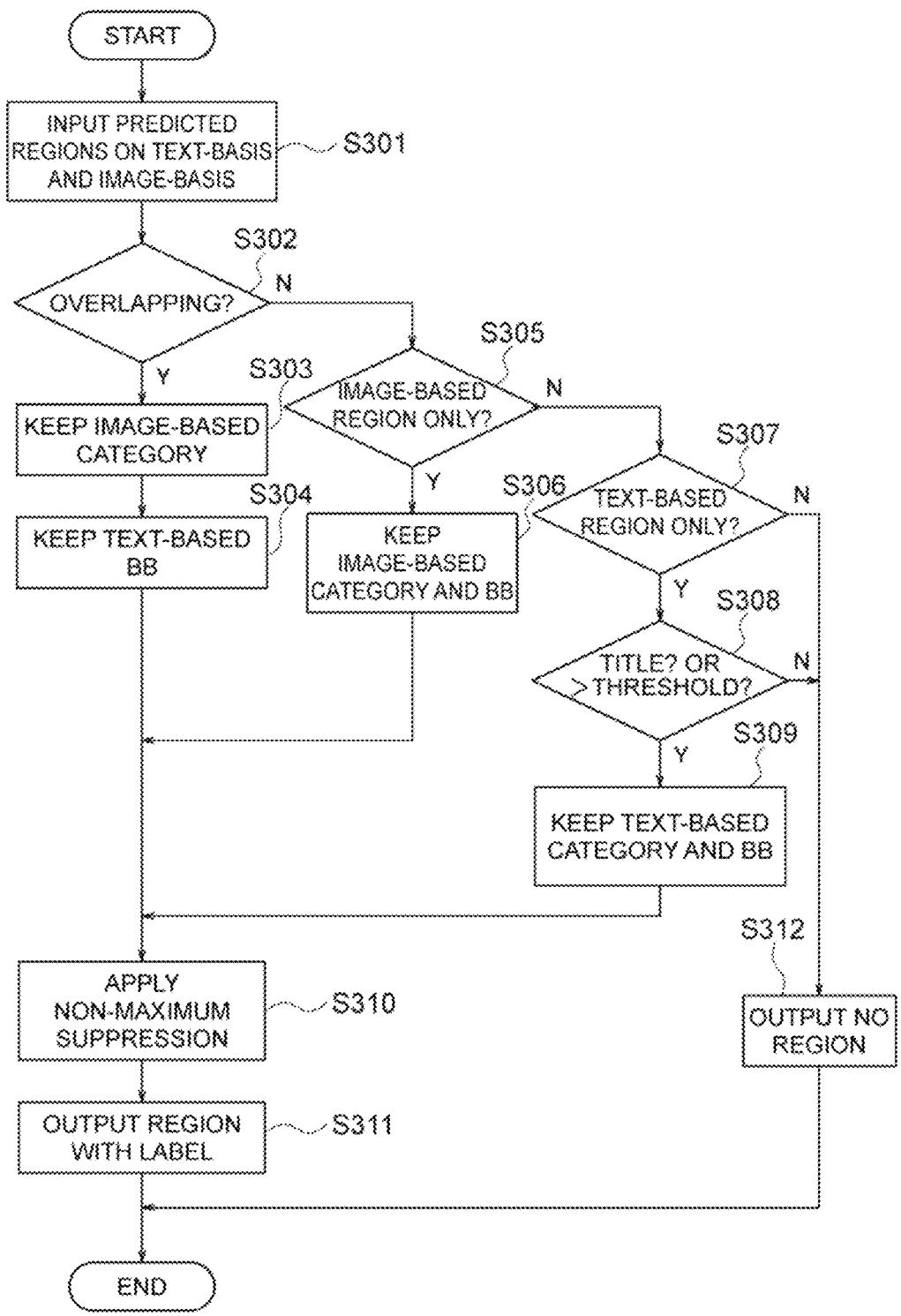
FIG. 12 is a flowchart illustrating an exemplary detailed processing procedure of merging processing (step S3) of FIG. 2.

Merge Processing of Processing Results of Region Detection and Region Classification FIG. 12 is a flowchart illustrating an exemplary detailed processing procedure of the merge processing (in step S3) of the processing results of the region detection and region classification processing in FIG. 2, which is carried out by the region detection unit 12 of the document image analysis apparatus 1 according to the present embodiment.

In the merge processing shown in FIG. 12, both processing results are merged to complement the results of image-based region detection and region classification, which are generally more accurate and can detect any object from the image, with the results of text-based region detection and region classification, which can more accurately detect large size text and title regions.

In step S301, the region detection unit 12 of the document image analysis apparatus 1 inputs, as candidate regions, predicted regions predicted on a text basis and predicted regions predicted on an image basis. The candidate regions input in step S301 are labeled with respective categories that have been classified.

In step S302, the region detection unit 12 determines whether or not the text-based predicted candidate region overlaps with the image-based predicted candidate region.

If it is not determined that the text-based predicted region overlaps with the image-based predicted region in the document image (step S302:N), the processing proceeds to step S305. On the other hand, if it is determined that the text-based predicted region overlaps with the image-based predicted region in the document image (step S302:Y), the processing proceeds to step S303.

In step S303, the region detection unit 12 keeps (retains) the category labeled to the image-based region for the overlapping region in the document image.

In step S304, the region detection unit 12 keeps the bounding box of the text-based regions for the overlapping region, and proceeds to step S310. In other words, the bounding box of the image-based region is corrected by an outer frame of the region that contains the paragraph of the actual lines of text.

Returning to step S302, if it is determined that the predicted region predicted on the text basis and the predicted region predicted on the image basis do not overlap (step S302:N), in step S305, the region detection unit 12 determines whether or not only the predicted region on the image basis is detected.

If only the image-based predicted region is detected and the corresponding text-based predicted region is not detected (step S305:Y), the processing proceeds to step S306, and the region detection unit 12 keeps the category labeled to the image-based region and the bounding box of the region, and proceeds to step S310. On the other hand, if the image-based predicted region is not detected (step S305:N), the processing proceeds to step S307, and the region detection unit 12 determines whether or not the text-based predicted region is detected.

If only the text-based predicted region is detected and corresponding image-based predicted region is not detected (step S307:Y), the processing proceeds to step S308, and the region detection unit 12 further determines whether or not the text-based predicted region detected in step S307 is labeled with the category of the title or whether or not the size (or area) of the predicted region is greater than a predetermined threshold.

If the text-based predicted region detected in step S307 is labeled with a category of the title or the size of the predicted region is greater than a predetermined threshold (step S308:Y), then the region detection unit 12 keeps (retains) the category labeled to the text-based region and the bounding box of the region and proceeds to step S310. On the other hand, if the text-based predicted region detected in step S307 is labeled with a category other than the title (e.g., the column) and the size of the region is within a predetermined threshold (S308:N), the processing proceeds to step S312, and the region detection unit 12 deletes the predicted region detected in step S307 and terminates the processing.

According to the present embodiment, while giving priority to the detection results of the image-based predicted regions, the detection results of the text-based predicted regions are used complementarily when only the text-based predicted region is detected (step S307:Y), when the category labeled to the predicted region is the title, or when the size (area) of the predicted region is greater than the predetermined threshold. As a result, it makes it possible to extract the title regions (especially when the title is described in lowercase as well as the columns) and large size text regions in a more assured manner, both of which are relatively difficult to be extracted by the image-based region detection and region classification.

Returning to step S307, if neither the image-based candidate region nor the text-based candidate region is detected (step S307:N), the processing proceeds to step S312, and the region detection unit 12 terminates the processing without outputting regions.

In step S310, the region detection unit 12 applies the Non-Maximum Suppression to the categories labeled to the candidate regions kept in steps S304, S306 and S309, respectively, and the bounding boxes of the candidate regions, and proceeds to step S311.

The Non-Maximum Suppression is used by the region detection unit 12 as an algorithm for suppressing a plurality of regions (bounding boxes) detected in an overlapping manner for the same object (class) and extracting only region (bounding box) having the largest value.

Figure 13:
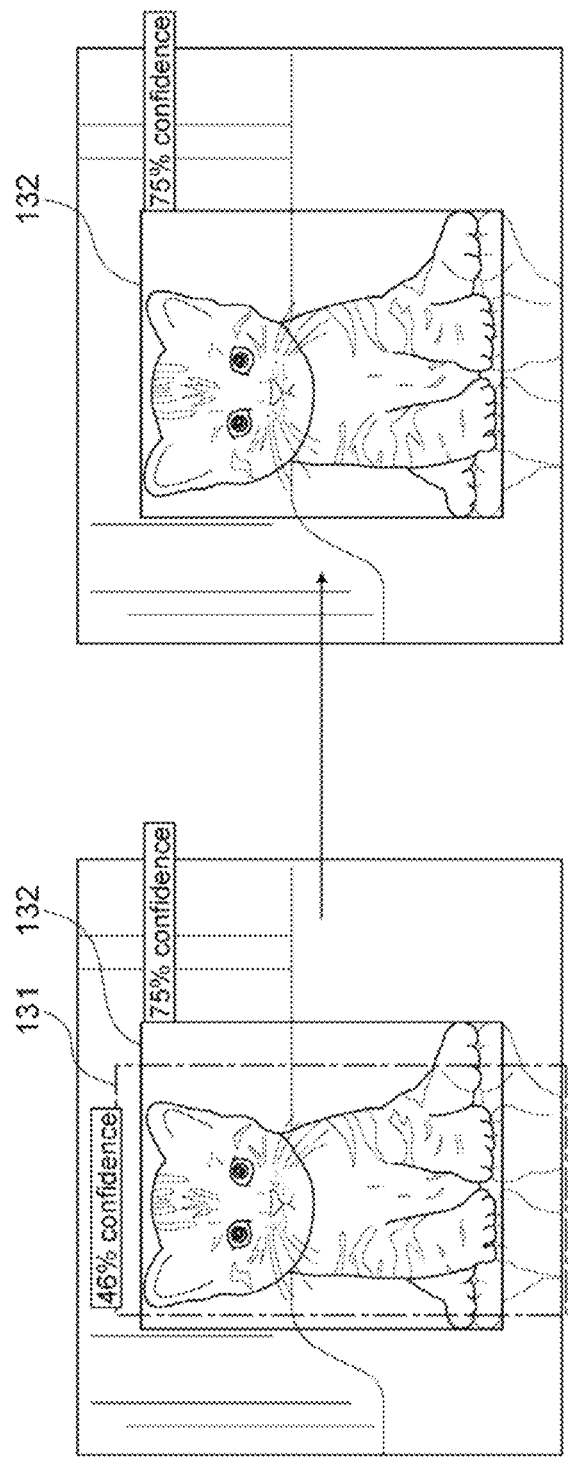
FIG. 13 is a schematic diagram showing exemplary Non-Maximum Suppression processing carried out in the merging processing of FIG. 12.

FIG. 13 is a schematic diagram for explaining the Non-Maximum Suppression carried out in step S310.

Referring to FIG. 13 on the left, two bounding boxes 131 and 132 are redundantly detected for the same object (i.e., cat in FIG. 13). It is assumed that the confidence score calculated for bounding box 131 is 46% and the confidence score calculated for bounding box 132 is 75%.

In the Non-Maximum Suppression, when the value of Intersection-over-Union (IoU) indicating the degree of overlap of the two bounding boxes 131 and 132 is larger than a predetermined threshold (for example, 50%), it is estimated that the two regions overlap with respect to one object, and the region other than one region having the maximum value is suppressed (deleted), while when the value of IoU is within a predetermined threshold, it is estimated that the two regions do not overlap, and the region is not suppressed (deleted). The IoU is calculated by dividing the area (Area of Overlap) of the overlap between the two bounding boxes by the union (Area of Union) of the two bounding boxes.

Referring to FIG. 13 on the left, since the IoU of the bounding boxes 131 and 132 is greater than the 50% threshold, the bounding box 132 with the largest confidence score (75%) is selected and the other bounding box 131 with the lower confidence score (46%) is suppressed, as shown in FIG. 13 on the right.

Returning to FIG. 12, in step S312, the region detection unit 12 outputs the predicted region, which is kept as a result of applying the Non-Maximum Suppression in step S310, as a region to be clustered into an article in step S4 of FIG. 2.

Figure 14:
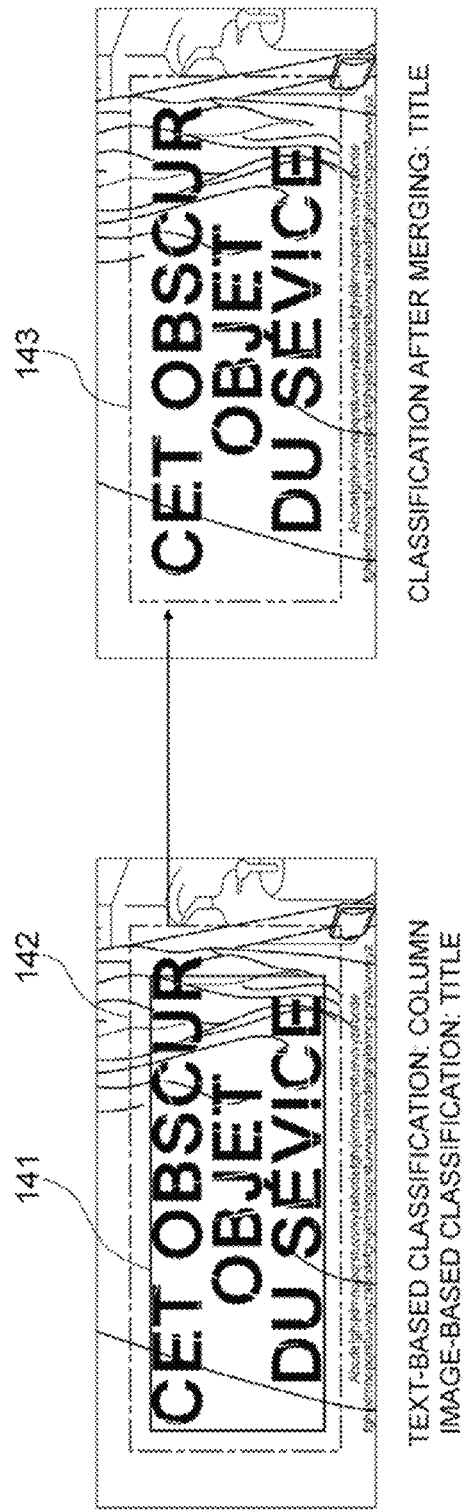
FIG. 14 is a schematic diagram explaining exemplary processing in the case where overlapping regions are found in the merging processing of FIG. 12.

FIG. 14 is a schematic diagram illustrating processing carried out when it is determined in step S302 of FIG. 12 that a text-based predicted region and an image-based predicted region overlap each other.

Referring to FIG. 14 on the left, an image-based candidate region bounding box 141 and a text-based candidate region bounding box 142 are detected as overlapping with respect to one object (step S302:Y in FIG. 12). It is assumed that the image-based predicted region is labeled with a category of the title and the text-based predicted region is labeled with a category of the column.

In this case, as shown in FIG. 14 on the right, the bounding box 142 of the text-based predicted region is kept (step S304), the category of the title labeled to the image-based predicted region is kept (step S305), and merged into a new region (i.e., bounding box 143).

Region Clustering Processing

Figure 15:
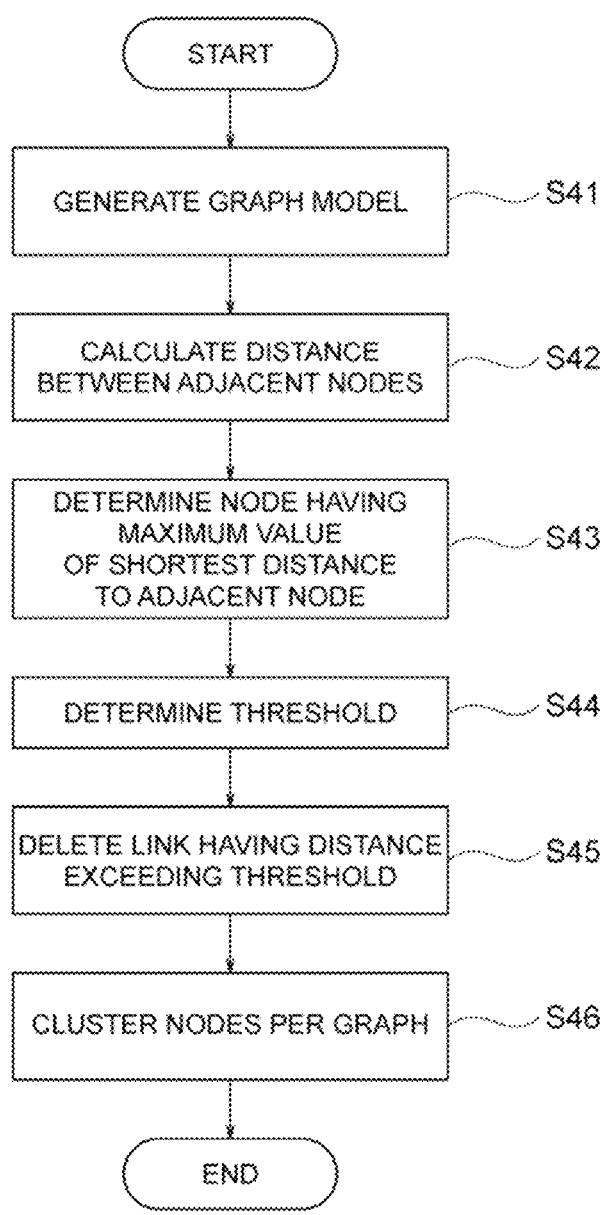
FIG. 15 is a flowchart illustrating an exemplary detailed processing procedure of the region clustering processing (step S4) of FIG. 2.

FIG. 15 is a flowchart illustrating an exemplary detailed processing procedure of the region clustering processing (in step S4) in FIG. 2 carried out by the region clustering unit 13 of the document image analysis apparatus 1.

In step S41, the region clustering unit 13 generates a graph for clustering the regions output from step S3 of FIG. 2. More particularly, the region clustering unit 13 connects a node of the region and a node of an adjacent region via a link to generate a graph for each of regions. As a geometric constraint, it is unnecessary to generate a link to a node of a region that is not adjacent to and thus distant from a certain region.

It should be noted that, in the case where the same articles are assumed to appear not to be continuous in the lateral (horizontal) direction of the document image, or in the case where a signature region delimiting articles or a title region of a next article is detected depending on the type of newspaper or magazine, the connection may be made via a link only to a node of a region adjacent in the longitudinal (vertical) direction. In this case, the nodes of the horizontally adjacent regions may be selectively connected via the link based on the categories assigned to the regions. Furthermore, as a semantic constraint, the title region may be assumed to be positioned at the beginning of an article and no link may be generated to the node in the upper left region of the title region.

In step S42, the region clustering unit 13 calculates the distance between the nodes in the graph generated in step S41. The distance between the nodes may be calculated as the distance between the edges of the two regions (paragraphs) having the shortest distance.

Figure 16:
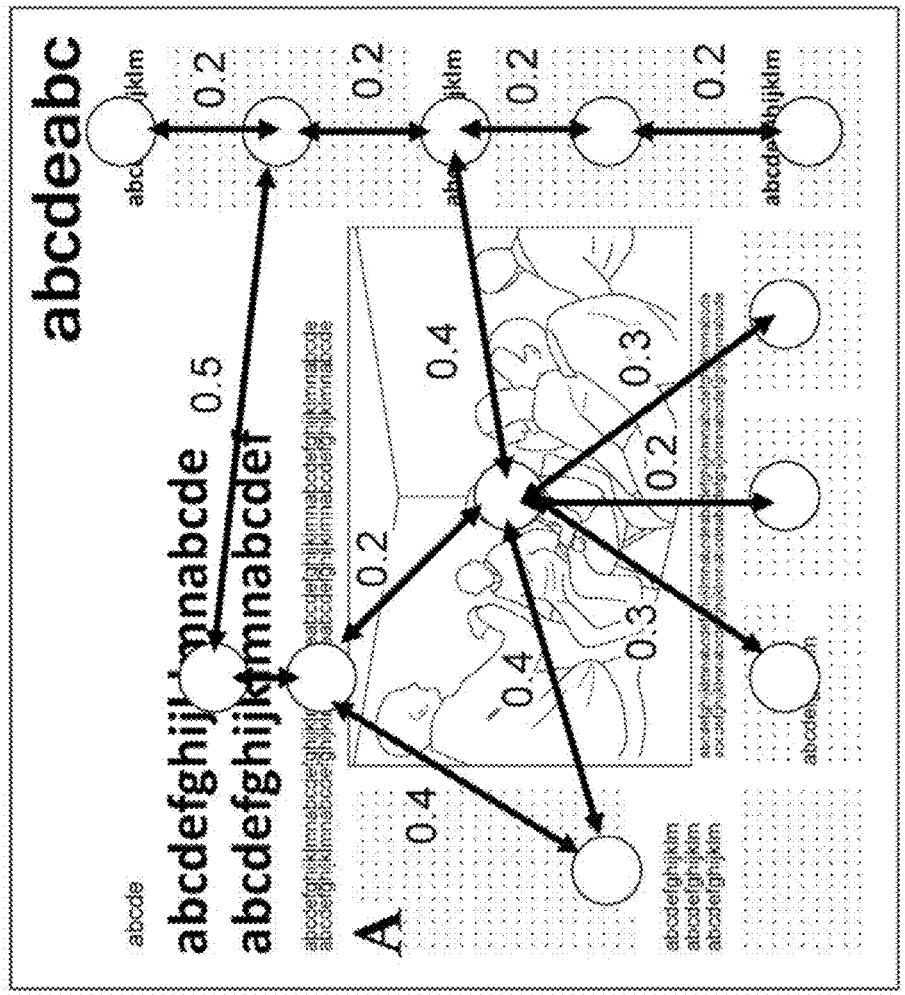
FIG. 16 is a schematic diagram showing an exemplary graph model output in the region clustering processing of FIG. 15.

FIG. 16 is a schematic diagram showing an exemplary graph model output in step S42. Referring to FIG. 16, the graph model has nodes representing respective regions (paragraphs) and links each connecting the nodes, and each of links is annotated with the distance between the nodes to which the link connects.

In step S43, the region clustering unit 13 acquires the shortest distance to one or more adjacent nodes of the node for each of the nodes in the generated graph, and determines the node of which shortest distance to the neighboring node is the maximum.

In step S44, the region clustering unit 13 sets the shortest distance to the adjacent node of the node determined in step S43 to the threshold for clustering.

A certain region labeled with the category always belongs to any of the articles, and a certain article includes at least two regions, for example, the title and the column. For this reason, each region (paragraph) can be assumed to have at least one adjacent region as a geometric constraint in clustering the regions. The present embodiment dynamically sets a threshold for clustering based on the constraint condition. In other words, the threshold determined in step S44 is the maximum distance used for ensuring that all nodes in the graph have any of neighboring nodes. Based on the thresholds determined here, a graph of the distance matrix shown in FIG. 8 may be generated between the nodes.

In step S45, the region clustering unit 13 deletes a link having a distance exceeding the threshold determined in step S44 from the graph.

In step S46, assuming that each of the graphs output in step S45 constitutes one article (cluster), the region clustering unit 13 clusters a plurality of regions belonging to one graph into one article.

Figure 17:
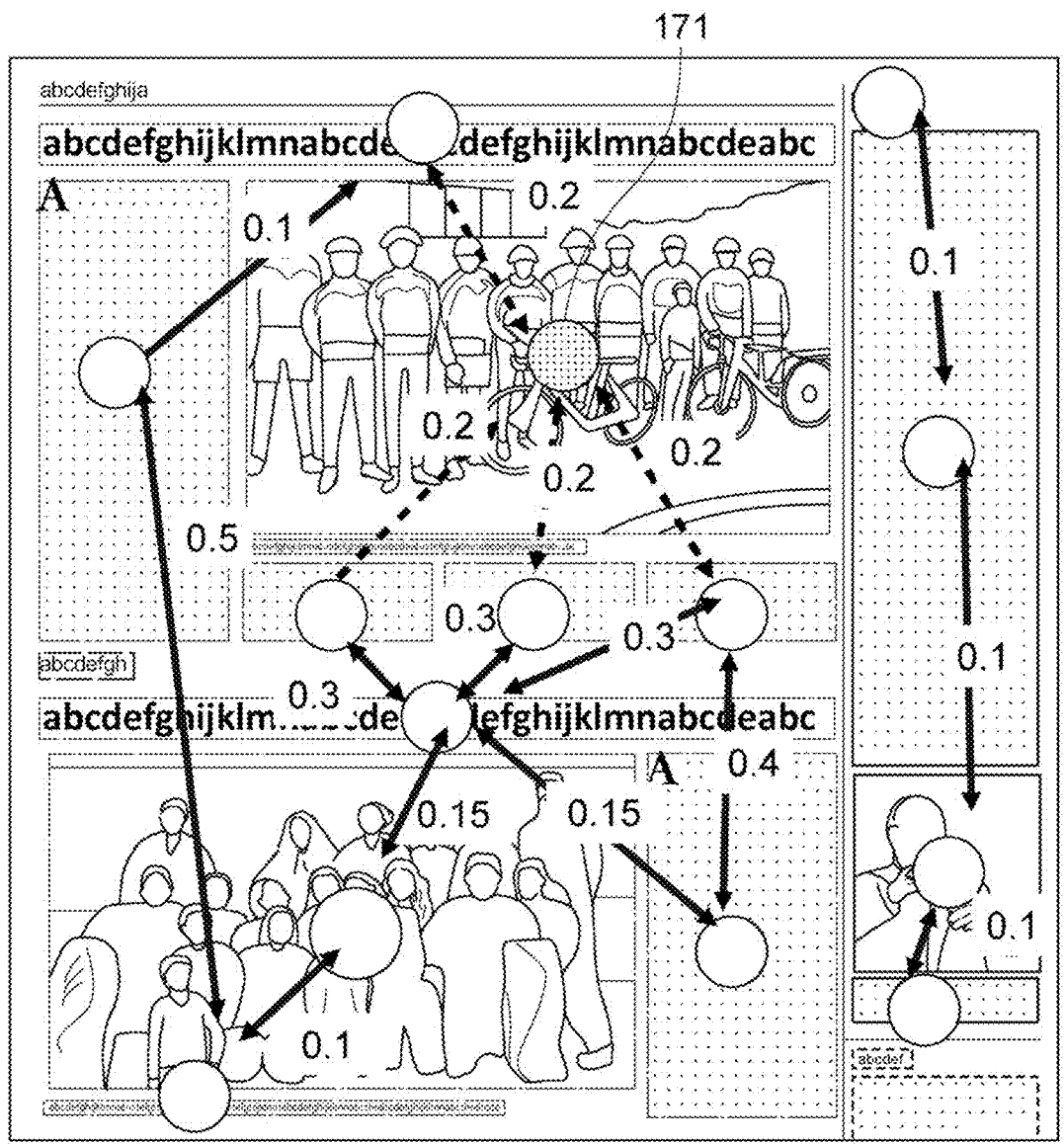
FIG. 17 is a schematic diagram showing another exemplary graph model output in the region clustering processing of FIG. 15.

FIG. 17 is a schematic diagram showing another example of the graph model output in step S42 of FIG. 15, in which nodes adjacent to each other in the vertical direction are connected via a link.

Referring to FIG. 17, since the node 171 of the region of interest has the distance of 0.2 with respect to any of adjacent nodes, in step S43, the node 171 is determined to be a node of which the shortest distance to the adjacent node is the largest. In order for this node 171 to have at least one adjacent node, the distance threshold for clustering is required to be at least 0.2. Thus, in the graph of FIG. 17, the threshold value is set to 0.2.

Figure 18:
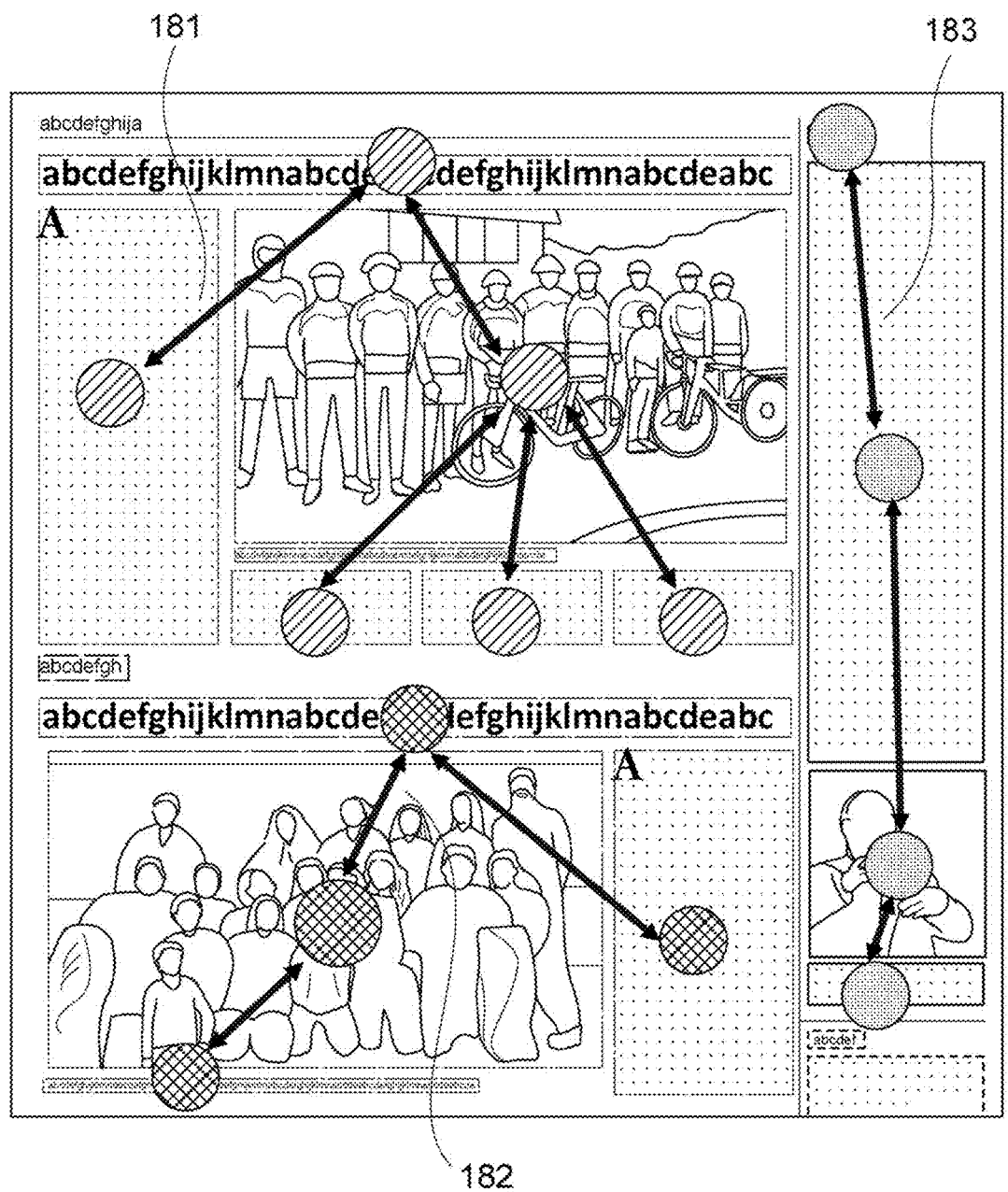
FIG. 18 is a schematic diagram showing an exemplary document image in which regions are clustered into an article based on the graph model of FIG. 17.

FIG. 18 is a schematic diagram showing an exemplary document image in which regions are clustered into an article based on the graph model of FIG. 17. Three mutually independent graphs are generated by deleting a link having a distance exceeding the threshold value of 0.2 from the graph model of FIG. 17. One graph corresponds to one clustered article. Thus, FIG. 18 shows that regions (paragraphs) of a document image are clustered into three articles (181, 182, and 183) corresponding to the three graphs, respectively.

Instead of or in addition to the region clustering processing described above with reference to FIG. 17, the region clustering unit 13 may cluster a plurality of regions based on the category assigned to each of the plurality of regions.

For example, the region clustering unit 13 may determine the range to be included in the cluster based on the size or width of the region to which the category of the title is assigned.

Reading Order Assigning Processing

Figure 19:
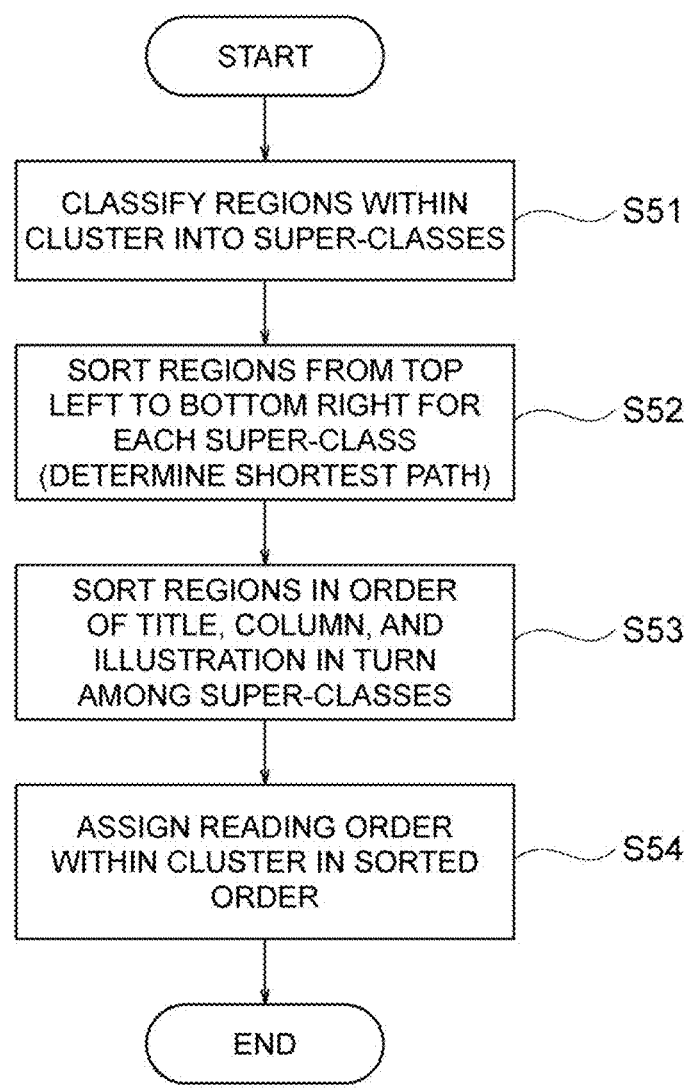
FIG. 19 is a flowchart illustrating an exemplary detailed processing procedure of the reading order assignment processing (step S5) of FIG. 2.

FIG. 19 is a flowchart illustrating an exemplary detailed processing procedure of the reading order assigning processing (in step S5) of FIG. 2 executed by the reading order assignment unit 14 of the document image analysis apparatus 1.

In step S51, the reading order assignment unit 14 classifies the regions (paragraphs) belonging to one article (cluster) into three super-classes according to the category labeled to the regions. However, according to the present embodiment, the article in the document image is no more than an example of a cluster, and the cluster may be configured by arbitrarily clustering a plurality of regions in the document image, and is not limited to the article.

The article has, for example, three super-classes, that is, the title, the column, and the illustration.

The regions of the pre-title, the title, and a sub-title are classified into the super-class of the title. The regions of the column and the signature are classified into the super-class of the column. Likewise, the regions of the illustration including the photograph, and regions of the caption are classified into the super-class of the illustration. In other words, the super-class is a broader concept into which a plurality of categories are generalized.

In step S52, the reading order assignment unit 14 sorts a plurality of regions belonging to the super-class in the order from a region positioned in top left to a region positioned in bottom right in turn in each super-class. Within a certain super-class, the shortest path from top left to bottom right determines the reading order of a plurality of regions within the super-class.

In step S53, the reading order assignment unit 14 sorts the super-classes in the order of the title, the column, and the illustration among the super-classes. However, an illustration may precede the column as appropriate.

In step S54, the reading order assignment unit 14 assigns the reading order to a plurality of regions belonging to one cluster in the order sorted in steps S52 and S53.

Figure 20:
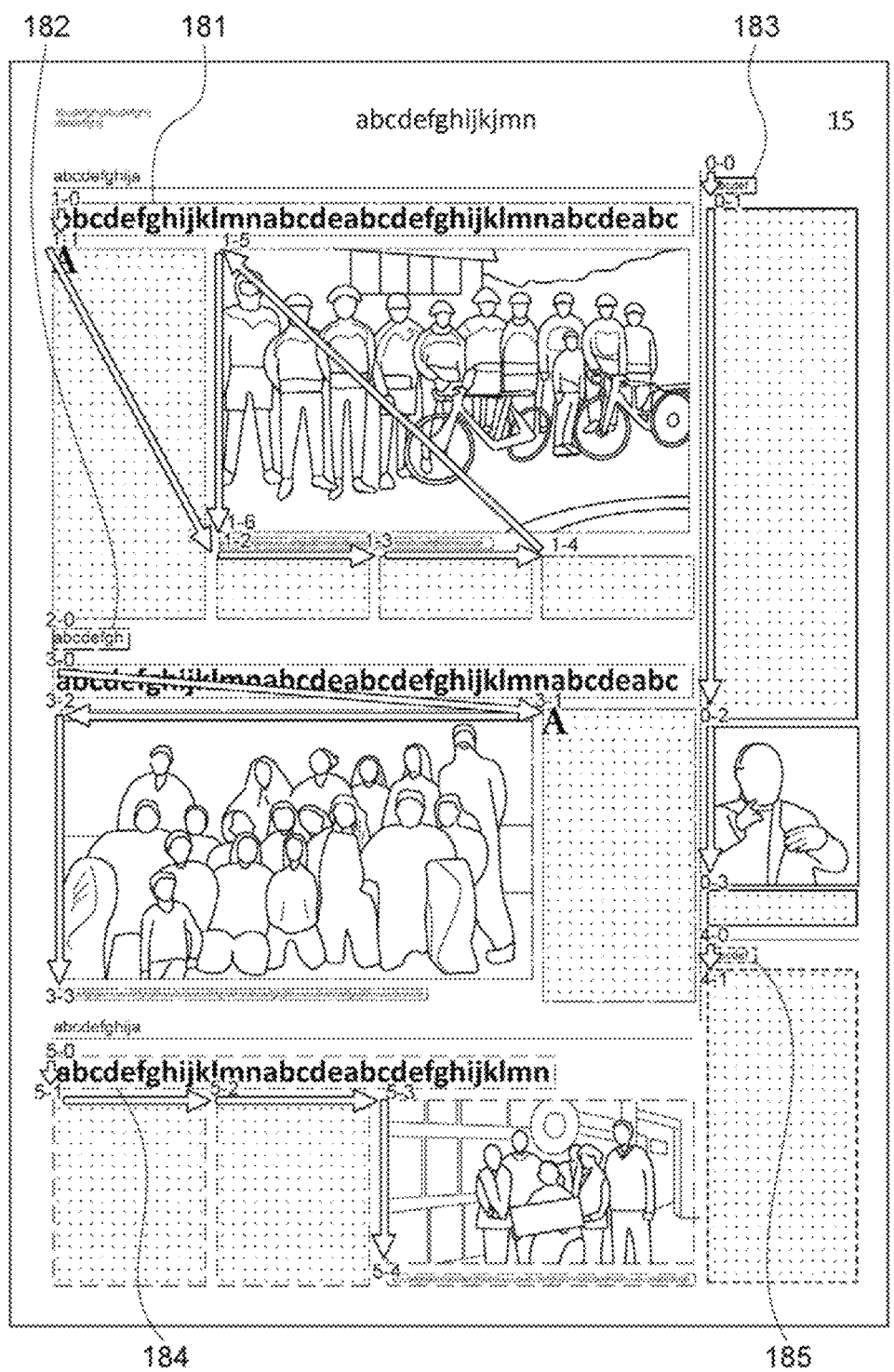
FIG. 20 is a schematic diagram showing an exemplary document image to which the reading order is assigned, which is output in the reading order assignment processing of FIG. 19.

FIG. 20 is a schematic diagram showing an exemplary document image to which the reading order is assigned, which is output in step S54 of FIG. 19.

Referring to FIG. 20, articles 181 to 185 are each assigned a reading order within the cluster. For example, in the article 181, it is apparent that the reading order is assigned in the order of the title (1-0), the columns (1-1 to 1-4), the illustration (photograph) (1-5), and the caption (1-6). The reading order is assigned, within the super-class, in the order of top left to bottom right, and among the super-classes, in the order of the title, the column, and the illustration in turn. Likewise, the reading orders are assigned similarly to the articles 182 to 185.

As shown in FIG. 20, the reading order assignment unit 14 of the present embodiment assigns the reading order to a plurality of regions belonging to the respective clusters such that the reading order is continuous over a plurality of clusters, by, for example, assigning the reading order to the current cluster and subsequently assigning the continuous reading order to the next cluster.

As described above, according to the present embodiment, since the reading order is assigned to the regions only within a cluster, the reading order is not assigned back and forth across articles. Furthermore, a plurality of super-classes are sorted in order and the reading order is assigned to the regions belonging to the sorted super-class, so that, for example, an illustration positioned within a column is not interposed between semantically consecutive columns in the reading order.

Integration Processing for Article Across Multiple Pages

Although the processing of generating a structured document from a document image input per one page has been described above, according to the present embodiment, an article across a plurality of pages can be further tracked and integrated.

More particularly, the topology analysis is performed using the following rules on the constraint condition that, inputting a plurality of document images across a plurality of pages, one article does not have two titles and one article has at least one column.

Separating an article with two titles
Integrating articles with two pages of image (an illustrations or a photograph)
Merging an article without a column into the nearest article Furthermore, as a semantic analysis, articles sharing the same keyword may be merged unless it conflicts with other rules.

By repeating the above processing, it makes it possible to integrate articles across a plurality of pages.

Figure 21:
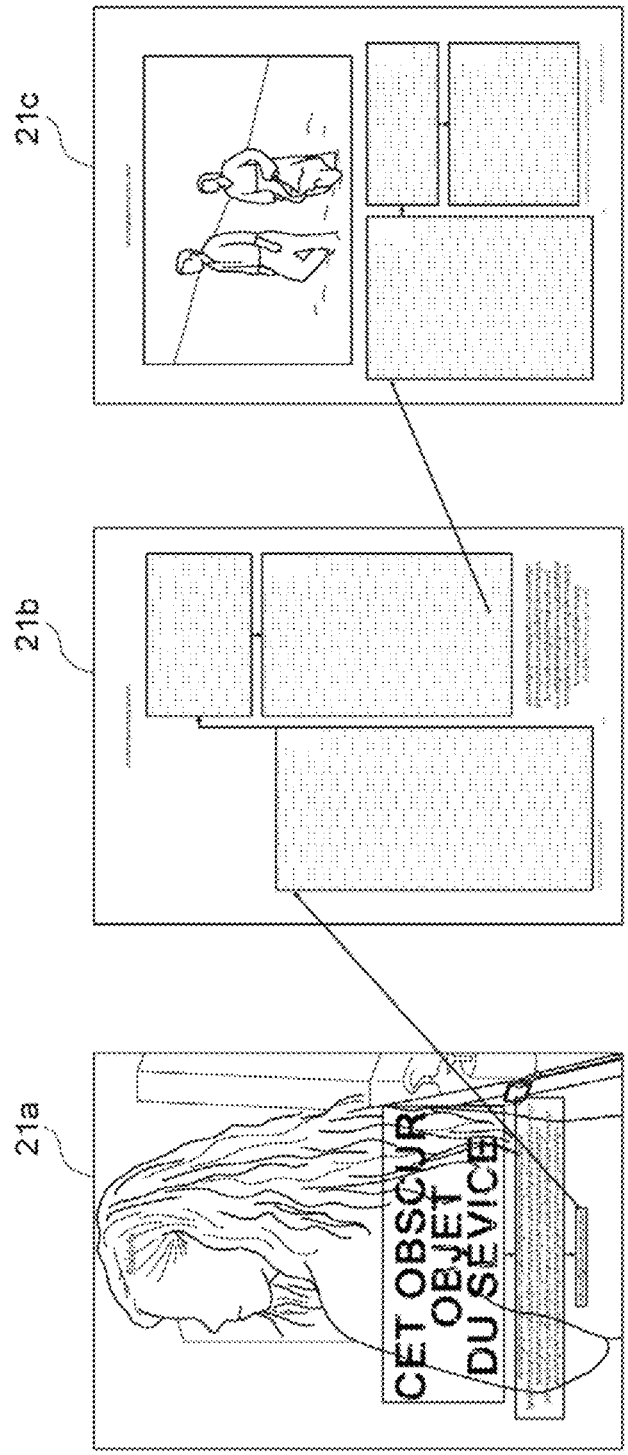
FIG. 21 is a schematic diagram showing an exemplary document image in which articles are tacked across a plurality of pages, which is output by the document image analysis apparatus according to the present embodiment of the present invention.

FIG. 21 is a schematic diagram showing an exemplary document image output by the document image analysis apparatus 1 according to the present embodiment, in which articles are tracked across a plurality of pages. Referring to FIG. 21, over a plurality of pages 21a, 21b, and 21c, articles are integrated into one, and a reading order is assigned to a plurality of regions in the integrated article.

FIG. 22 is a diagram showing an example of an XML description of a structured document output in the structured document output processing (step S6) of FIG. 2.

Referring to FIG. 22, the structured document includes one article described from <article> to </article>. This article contains a title ("title"), a subtitle ("subtitle"), an illustration ("illustration"), a caption ("caption"), five columns ("column"), and a signature ("signature"), each with a category of the region described in <part type>.

It should be noted that although the reading order is not explicitly described in the structured document of FIG. 22, the reading order assigned to each region ("part") may be described, the regions may be sorted in the reading order in the XML description, or the reading order may be obtained dynamically by referring to a separate description associated with the XML description of the structured document.

In addition to the reading order, any attribute of the region extracted by the document image analysis apparatus 1 according to the present embodiment, such as the font type, the font size, the font color, or the like, may be added to the description of the region as appropriate in the XML description of the structured document.

Hardware Configuration of the Present Embodiment

Figure 23:
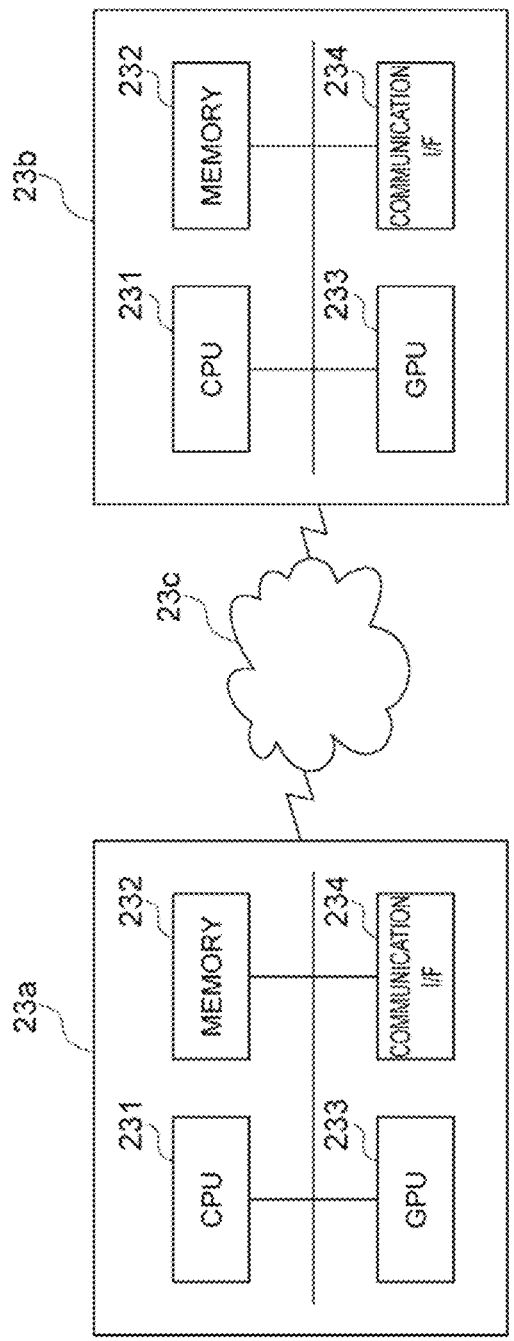
FIG. 23 is a schematic diagram showing an exemplary hardware and network configuration of the document image analysis apparatus according to the present embodiment of the present invention.

FIG. 23 shows an exemplary hardware configuration of the document image analysis apparatus 1 according to the present embodiment.

The document image analysis apparatus 1 according to the present embodiment can be implemented on any one or more computers, mobile devices, or any other processing platform.

Referring to FIG. 23, there is shown an example in which the document image analysis apparatus 1 according to the present embodiment is implemented in a computer system including a plurality of computers 23a and 23b.

A plurality of computers 23a and 23b are interconnected by a wired or wireless network 23c so as to be able to communicate with each other.

The computers 23a and 23b each include a Central Processing Unit (CPU) 231, a memory 232, a Graphics Processing Unit (GPU) 233, and a communication I/F 234. The CPU 231, the memory 232, the GPU 233, and the communication I/F 234 are interconnected by a bus.

Although two computers 23a and 23b are illustrated in FIG. 23, the number of computers on which the present embodiment can be implemented is not limited thereto and may be a single computer or three or more computers. All or part of the computers 23a and 23b may include an output device such as a display for outputting the various processing results described above, and an input device for inputting various commands.

The CPU 231 is constituted with one or more processors, which reads a program from a Read Only Memory (ROM) to a Random Access Memory (RAM) and uses the RAM as a work area to execute the loaded program. Thus, the CPU 231 comprehensively controls respective components of the computers 23a and 23b. The program read by the CPU 231 may be provided, for example, via the network 23c, such as the Internet, or may be stored in a computer readable external storage medium, such as a DVD-ROM or USB memory, and then supplied to the CPU 231.

The memory 232 includes a memory device such as the ROM, the RAM, and a hard disk drive. The ROM is a non-volatile read-only memory that stores control instructions or programs that operate the CPU 231. The RAM is a volatile random access memory used for a work memory or a temporary storage of data when executing programs.

The GPU 233 has higher computing capabilities than the CPU 231, and by operating multiple or a large number of GPUs 233 in parallel, it makes it possible to provide higher processing performance, particularly for the image processing applications that use the machine learning such as the present embodiment. The GPU 233 typically includes a processor and a shared memory. Respective processors acquire data from a high speed shared memory and execute a common program so as to execute the same kind of computation in a large amount at high speed.

The communication I/F 234 is an interface that allows the computers 23*a* and 23*b* to communicate with other computers, such as servers, and may include, for example, a network interface card (NIC). The communication I/F 234, under the control of the CPU 231, inputs information received from other computers into the CPU 231 or the memory 232 and transmits information to other computers.

As described above, according to the present embodiment, the document image analysis apparatus detects regions from a document image, classifies the detected regions, and labels the classified regions as categories, respectively. The document image analysis apparatus further clusters the regions labeled with categories into a cluster, and assigns a reading order to the regions in the clustered article.

As a result, according to the document image analysis apparatus of the present embodiment, for each region of the document image, it makes it possible to generate a structured document in which various attributes such as the category, the reading order, the font type, the font size, the font color, and the like are assigned with higher accuracy.

Furthermore, according to the present embodiment, since the region detection from the document image and the region classification are carried out by concurrently using the text line-based processing and the image-based processing, it makes it possible to generate the structured document at a higher speed and with higher accuracy under less training data input (annotation) and less CPU load.

Consequently, it makes it possible to improve the browsability of document images in various device types and use cases so as to improve the availability of document images.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Document Image Analysis Apparatus; 11: Document Image Acquisition Unit; 12: Region Detection Unit; 13: Region Clustering Unit; 14: Reading Order Assignment Unit; 15: Structured Document Output Unit

What is claimed is:

1. A document image analysis apparatus, comprising:
at least one memory configured to store program code; and
electronic circuitry including at least one of a field programmable gate array (FPGA), an application specific integrated circuit (ASIC), and at least one processor, the at least one processor being configured to read and operate according to the program code, the electronic circuitry configured to:
acquire a document image having an article, the article having at least a title and a column;
detect a plurality of regions from the document image acquired, the plurality of regions representing respective portions of the article;
classify the plurality of regions into any of a plurality of classes;
cluster the plurality of regions detected to integrate into a cluster that corresponds to a single article;
classify regions belonging to a single cluster into any of a plurality of super-classes based on the classified classes of the regions, wherein the plurality of super-classes comprises a title region, a column region and an illustration region;
sort the classified regions within each of the plurality of super-classes and across the plurality of super-classes; and
assign, within a single cluster, a reading order to at least some of the sorted classified regions, the reading order being an order in which the plurality of regions are to be read in the article.

2. The document image analysis apparatus according to claim 1, wherein the electronic circuitry is further configured to:
classify the plurality of regions detected and assign a category to each of the plurality of regions.

3. The document image analysis apparatus according to claim 2, wherein the electronic circuitry is further configured to include:
a first analytical engine configured to analyze text of the document image, and detect the plurality of regions to classify the plurality of regions detected; and
a second analytical engine configured to analyze an image of the document image, and detect the plurality of regions to classify the plurality of regions detected, and
wherein the electronic circuitry is further configured to execute both of the first analytical engine and the second analytical engine.

4. The document image analysis apparatus according to claim 3, wherein the electronic circuitry is further configured to:
merge complementarily detection and classification results of the plurality of regions output by the first analytical engine, and detection and classification results of the plurality of regions output by the second analytical engine, and supply merged results to the electronic circuitry to be clustered.

5. The document image analysis apparatus according to claim 4, wherein
when a detected region overlaps between the first analytical engine and the second analytical engine, the electronic circuitry is configured to retain a category assigned by the second analytical engine to the detected region.

6. The document image analysis apparatus according to claim 5, wherein
when a detected region overlaps between the first analytical engine and the second analytical engine, the electronic circuitry corrects a bounding box detected by the second analytical engine with respect to the detected region with information of the detected region detected by the first analytical engine.

7. The document image analysis apparatus according to claim 4, wherein
the electronic circuitry is configured to compare a size of a region that is detected by the first analytical engine and not detected by the second analytical engine with a predetermined threshold, and does not output the region to be clustered when the size is equal to or smaller than the predetermined threshold.

8. The document image analysis apparatus according to claim 2, wherein
the electronic circuitry is configured to cluster the plurality of regions based on the category assigned to each of the plurality of regions.

9. The document image analysis apparatus according to claim 8, wherein
the electronic circuitry is configured to cluster the plurality of regions based on a size of a region to which a predetermined category is assigned.

10. The document image analysis apparatus according to claim 2, wherein
the electronic circuitry is configured to integrate clusters over a plurality of document images based on a plurality of categories assigned to the plurality of regions, respectively.

11. The document image analysis apparatus according to claim 2, wherein the electronic circuitry is further configured to:
generate a structured document that describes at least the reading order, text, and the category of the regions included in the cluster from the cluster including the regions to which the reading order is assigned.

12. The document image analysis apparatus according to claim 1, wherein
the electronic circuitry is configured to calculate a distance to an adjacent region for each of the plurality of regions, and clusters the plurality of regions based on the distance calculated.

13. The document image analysis apparatus according to claim 12, wherein
the electronic circuitry is configured to dynamically determine a threshold of the distance to the adjacent region calculated for each of the plurality of regions, and clusters regions within the threshold of the distance determined.

14. The document image analysis apparatus according to claim 13, wherein
the electronic circuitry is configured to determine a region that has a maximum value of a shortest distance to an adjacent region among the plurality of regions, and sets the maximum value of the shortest distance to the adjacent region to the threshold of the distance.

15. The document image analysis apparatus according to claim 13, wherein
the electronic circuitry is configured to cluster regions adjacent to each other in a vertical direction of the document image based on the distance to the adjacent region, and clusters regions adjacent to each other in a horizontal direction of the document image based on the category assigned to each region.

16. The document image analysis apparatus according to claim 1, wherein
the electronic circuitry is configured to assign the reading order to the plurality of regions belonging to each cluster such that the reading order is continuous among a plurality of clusters.

17. The document image analysis apparatus according to claim 1, wherein the electronic circuitry is further configured to generate, from the cluster, a structured document with the reading order of the plurality of regions included in the cluster.

18. The document image analysis apparatus according to claim 1, wherein the electronic circuitry is further configured to generate, from the cluster, a structured document with the reading order of the plurality of regions included in the cluster, the structured document being structured to be dynamically reconstructed according to the reading order.

19. A document image analysis method executed by a document image analysis apparatus, comprising:
acquiring a document image having an article, the article having at least a title and a column;
detecting a plurality of regions from the document image acquired, the plurality of regions representing respective portions of the article;
classifying the plurality of regions into any of a plurality of classes;
clustering the plurality of regions detected to integrate into a cluster that corresponds to a single article;
classifying regions belonging to a single cluster into any of a plurality of super-classes based on the classified classes of the regions, wherein the plurality of super-classes comprises a title region, a column region and an illustration region;
sorting the classified regions within each of the plurality of super-classes and across the plurality of super-classes; and
assigning, within a single cluster, a reading order to at least some of the sorted classified regions, the reading order being an order in which the plurality of regions are to be read in the article.

20. A non-transitory computer readable medium having stored thereon a document image analysis computer program for causing a computer to execute document image analysis processing, the computer program causing the computer to:
acquire a document image having an article, the article having at least a title and a column;
detect a plurality of regions from the document image acquired, the plurality of regions representing respective portions of the article;
classify the plurality of regions into any of a plurality of classes;
cluster the plurality of regions detected to integrate into a cluster that corresponds to a single article; classify regions belonging to a single cluster into any of a plurality of super-classes based on the classified classes of the regions, wherein the plurality of super-classes comprises a title region, a column region and an illustration region;
sort the classified regions within each of the plurality of super-classes and across the plurality of super-classes; and
assign, within a single cluster, a reading order to at least some of the sorted classified regions, the reading order being an order in which the plurality of regions are to be read in the article.

* * * * *